United States Patent
Li et al.

(10) Patent No.: US 12,088,385 B2
(45) Date of Patent: Sep. 10, 2024

(54) CONFIGURATIONS AND FEEDBACK SCHEMES FOR COMPRESSED CHANNEL STATE INFORMATION (CSI)

(71) Applicant: QUALCOMM Incorporated, San Diego, CA (US)

(72) Inventors: Qiaoyu Li, Beijing (CN); Liangming Wu, Beijing (CN); Chenxi Hao, Beijing (CN); Joseph Binamira Soriaga, San Diego, CA (US); Hao Xu, Beijing (CN)

(73) Assignee: QUALCOMM Incorporated, San Diego, CA (US)

( * ) Notice: Subject to any disclaimer, the term of this patent is extended or adjusted under 35 U.S.C. 154(b) by 470 days.

(21) Appl. No.: 17/311,773

(22) PCT Filed: Dec. 19, 2019

(86) PCT No.: PCT/CN2019/126599
§ 371 (c)(1),
(2) Date: Jun. 8, 2021

(87) PCT Pub. No.: WO2020/125713
PCT Pub. Date: Jun. 25, 2020

(65) Prior Publication Data
US 2022/0029685 A1 Jan. 27, 2022

(30) Foreign Application Priority Data
Dec. 20, 2018 (WO) ................ PCT/CN2018/122393

(51) Int. Cl.
*H04B 7/06* (2006.01)
*H04B 7/0456* (2017.01)

(52) U.S. Cl.
CPC ......... *H04B 7/0658* (2013.01); *H04B 7/0456* (2013.01); *H04B 7/0478* (2013.01);
(Continued)

(58) Field of Classification Search
CPC .. H04B 7/0408; H04B 7/0456; H04B 7/0478; H04B 7/048; H04B 7/0481;
(Continued)

(56) References Cited

U.S. PATENT DOCUMENTS

| | | | |
|---|---|---|---|
| 2018/0076871 A1 | 3/2018 | Rahman et al. | |
| 2018/0083676 A1* | 3/2018 | Wei | ........................ H04L 1/0031 |

(Continued)

FOREIGN PATENT DOCUMENTS

| | | | |
|---|---|---|---|
| CN | 101626588 A | 1/2010 | |
| CN | 102088333 A | 6/2011 | |

(Continued)

OTHER PUBLICATIONS

Supplementary European Search Report—19898445.2—Search Authority—Munich—Aug. 9, 2022.

(Continued)

*Primary Examiner* — Young T. Tse
(74) *Attorney, Agent, or Firm* — QUALCOMM Incorporated

(57) ABSTRACT

Configurations and feedback schemes for compressed channel state information (CSI) feedback are provided. A User Equipment (UE) determines a constraint on a total number of transfer domain coefficients to be reported for compressed Channel State Information (CSI) feedback by the UE for a plurality of beams identified for the feedback, wherein each transfer domain coefficient is associated with amplitude information and phase information. The UE selects from a transfer domain coefficient compression matrix, based on the constraint, a set of one or more transfer domain coefficients to report for each of the beams. The UE reports information indicating a number of selected transfer domain coefficients in the set of transfer domain coefficients for each beam and a location of each transfer domain coefficient (Continued)

within the transfer domain coefficient compression matrix and reports at least the amplitude and phase information for the selected coefficients.

30 Claims, 10 Drawing Sheets

(52) U.S. Cl.
CPC ......... *H04B 7/0626* (2013.01); *H04B 7/0634* (2013.01); *H04B 7/0695* (2013.01)

(58) Field of Classification Search
CPC .. H04B 7/0626; H04B 7/0632; H04B 7/0634; H04B 7/0658; H04B 7/0663; H04B 7/0695
USPC ........ 375/259, 260, 267, 299; 370/208, 210, 370/328–330, 335, 337, 342, 344, 347
See application file for complete search history.

(56) References Cited

U.S. PATENT DOCUMENTS

| | | | |
|---|---|---|---|
| 2018/0145737 A1 | 5/2018 | Rahman et al. | |
| 2018/0212660 A1* | 7/2018 | Gao | H04B 7/0626 |
| 2018/0262253 A1* | 9/2018 | Rahman | H04B 7/0452 |
| 2018/0278315 A1* | 9/2018 | Wu | H04B 7/0632 |
| 2018/0302140 A1* | 10/2018 | Rahman | H04B 7/0626 |
| 2019/0199420 A1* | 6/2019 | Faxér | H04L 5/0057 |
| 2020/0186207 A1* | 6/2020 | Davydov | H04B 7/0469 |

FOREIGN PATENT DOCUMENTS

| | | |
|---|---|---|
| CN | 102325013 A | 1/2012 |
| CN | 103297202 A | 9/2013 |
| CN | 103378950 A | 10/2013 |
| EP | 2840731 A1 | 2/2015 |
| EP | 3322103 A1 | 5/2018 |
| WO | 2018226581 A1 | 12/2018 |

OTHER PUBLICATIONS

CATT: "Considerations on Type II CSI Enhancement", 3GPP TSG RAN WG1 Meeting #95, R1-1812634, Nov. 16, 2018 (Nov. 16, 2018), 7 Pages, section 2.
International Search Report and Written Opinion—PCT/CN2018/122393—ISA/EPO—Aug. 27, 2019.
International Search Report and Written Opinion—PCT/CN2019/126599—ISA/EPO—Mar. 17, 2020.
Nokia, et al., "CSI Feedback Overhead Reduction for MU-MIMO Enhancements," R1-1813488, 3GPP TSG RAN WG1 Meeting #95, Spokane, USA, Nov. 12-16, 2018, 10 pages, section 2.

* cited by examiner

CONFIGURATIONS AND FEEDBACK SCHEMES FOR COMPRESSED CHANNEL STATE INFORMATION (CSI)

CROSS REFERENCE TO RELATED APPLICATIONS

This application is a national stage application under 35 U.S.C. 371 of PCT/CN2019/126599, filed Dec. 19, 2019, which claims priority to PCT Application No. PCT/CN2018/122393, entitled "CONFIGURATIONS AND FEEDBACK SCHEMES FOR COMPRESSED CHANNEL STATE INFORMATION (CSI)", filed on Dec. 20, 2018, which are expressly incorporated by reference herein in their entireties.

BACKGROUND

Field of the Disclosure

Aspects of the present disclosure relate to wireless communications, and more particularly, to techniques for configuring and reporting compressed channel state information (CSI).

Description of Related Art

Wireless communication systems are widely deployed to provide various telecommunication services such as telephony, video, data, messaging, broadcasts, etc. These wireless communication systems may employ multiple-access technologies capable of supporting communication with multiple users by sharing available system resources (e.g., bandwidth, transmit power, etc.). Examples of such multiple-access systems include 3rd Generation Partnership Project (3GPP) Long Term Evolution (LTE) systems, LTE Advanced (LTE-A) systems, code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems, to name a few.

In some examples, a wireless multiple-access communication system may include a number of base stations (BSs), which are each capable of simultaneously supporting communication for multiple communication devices, otherwise known as user equipments (UEs). In an LTE or LTE-A network, a set of one or more base stations may define an eNodeB (eNB). In other examples (e.g., in a next generation, a new radio (NR), or 5G network), a wireless multiple access communication system may include a number of distributed units (DUs) (e.g., edge units (EUs), edge nodes (ENs), radio heads (RHs), smart radio heads (SRHs), transmission reception points (TRPs), etc.) in communication with a number of central units (CUs) (e.g., central nodes (CNs), access node controllers (ANCs), etc.), where a set of one or more distributed units, in communication with a central unit, may define an access node (e.g., which may be referred to as a base station, 5G NB, next generation NodeB (gNB or gNodeB), TRP, etc.). A base station or distributed unit may communicate with a set of UEs on downlink channels (e.g., for transmissions from a base station or to a UE) and uplink channels (e.g., for transmissions from a UE to a base station or distributed unit).

These multiple access technologies have been adopted in various telecommunication standards to provide a common protocol that enables different wireless devices to communicate on a municipal, national, regional, and even global level. New Radio (NR) (e.g., 5G) is an example of an emerging telecommunication standard. NR is a set of enhancements to the LTE mobile standard promulgated by 3GPP. It is designed to better support mobile broadband Internet access by improving spectral efficiency, lowering costs, improving services, making use of new spectrum, and better integrating with other open standards using OFDMA with a cyclic prefix (CP) on the downlink (DL) and on the uplink (UL). To these ends, NR supports beamforming, multiple-input multiple-output (MIMO) antenna technology, and carrier aggregation.

However, as the demand for mobile broadband access continues to increase, there exists a need for further improvements in NR and LTE technology. Preferably, these improvements should be applicable to other multi-access technologies and the telecommunication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide a method of wireless communications by a User Equipment (UE). The method generally includes determining a constraint on a total number of transfer domain coefficients to be reported for compressed Channel State Information (CSI) feedback by the UE for a plurality of beams identified for the feedback, wherein each transfer domain coefficient is associated with amplitude information and phase information, wherein the transfer domain is based at least on a set of DFT (Discrete Fourier Transform) bases or a set of DCT (Discrete Cosine Transfer) bases; selecting from a transfer domain coefficient compression matrix, based on the constraint, a set of one or more transfer domain coefficients to report for each of the beams; reporting information indicating a number of selected transfer domain coefficients in the set of transfer domain coefficients for each beam and a location of each transfer domain coefficient within the transfer domain coefficient compression matrix; and reporting at least the amplitude and phase information for the selected coefficients.

In an aspect, the total number of transfer domain coefficients to be reported is a fixed value.

In an aspect, wherein the coefficient compression matrix is a coefficient matrix in the transfer domain, wherein the number of rows of the coefficient matrix represents a number of the plurality of the identified beams and the number of columns of the coefficient matrix represents a number of transfer domain coefficients available for each beam, wherein each row corresponds to an identified beam and includes transfer domain coefficients associated with the identified beam, and wherein each element within a particular row represents a coefficient associated with an identified beam corresponding to the particular row.

In an aspect, wherein the selecting the transfer domain coefficients for the set of transfer domain coefficients for each beam includes selecting, from the coefficient compression matrix, coefficients with non-zero values from the row corresponding to the beam.

In an aspect, amplitude values and phase values for the CSI feedback are sorted in an order based at least on beam indices of the identified beams and further in an order based at least on coefficient indices of the transfer domain coefficients for each beam.

In an aspect, reporting information indicating the number and location comprises for each identified beam, using a bit-map with a bit-width equal to the overall number of the transfer domain coefficients available for the identified beam, to indicate the number and the locations of the selected transfer domain coefficients for the identified beam.

In an aspect, each bit included in the bit-map indicates whether a corresponding coefficient, of the available coefficients for the identified beam, is included in the set of one or more transfer domain coefficients for the beam.

In an aspect, a number of bits used for reporting bit-maps for all identified beams is based at least on a multiplication between the number of identified beams and a bit-width of each bit-map corresponding to each identified beam.

In an aspect, a number of bits used for reporting the amplitude and phase information for each selected transfer domain coefficient is based at least on a predefined number of bits to quantize amplitude and phase of the transfer domain coefficient.

In an aspect, the number of bits used for reporting the amplitude and phase information for the selected transfer domain coefficients for all beams is based at least on the multiplication of a value of the constraint on the total number of transfer domain coefficients and the number of bits used for reporting the amplitude and phase information for each selected transfer domain coefficient.

In an aspect, the information relating to the location of a transfer domain coefficient associated with an identified beam comprises an index of the transfer domain coefficient associated with the identified beam.

In an aspect, the method further includes obtaining a maximum number of transfer domain coefficients to feedback for each identified beam.

In an aspect, obtaining the maximum number of transfer domain coefficients to feedback for each identified beam comprises receiving the maximum number of transfer domain coefficients via Radio Resource Control (RRC) signaling or Downlink Control Information (DCI).

In an aspect, the maximum number of transfer domain coefficients to feedback for each identified beam is equal to the maximum number of available transfer domain coefficients for the identified beam.

In an aspect, a number of bits used for indicating the number of selected transfer domain coefficients associated with an identified beam is based at least on a ceiling of a logarithmic function, based by 2, of a value of the maximum number of transfer domain coefficients to feedback for each identified beam, and wherein a number of bits used for indicating the number of selected transfer domain coefficients for all identified beam is based at least on the multiplication between the number of bits used for indicating the number of selected transfer domain coefficients associated with each identified beam, and the number of identified beams.

In an aspect, the method further includes for each identified beam, using a plurality of sets of bits to explicitly indicate indices of the selected transfer domain coefficients associated with the identified beam, wherein each set of bits indicates a respective index of a selected coefficient associated with the identified beam.

In an aspect, a number of bits within a set of bits used for indicating a particular coefficient is based at least on, a ceiling of a logarithmic function, based by 2, of an overall number of coefficients available for each identified beam, wherein a number of bits used for the plurality of sets of bits to indicate the indices of the selected transfer domain coefficients associated with the identified beam is based at least on a multiplication between a number of selected transfer domain coefficients associated with the beam, and the number of bits within a set of bits, and wherein a number of bits used for indicating indices of the selected transfer domain coefficients for all identified beams is based on a summation of the number of bits used for indicating transfer domain coefficients for each identified beam.

In an aspect, the method further includes obtaining a maximum number of transfer domain coefficients and a minimum number of transfer domain coefficients to feedback for each identified beam In an aspect, obtaining the maximum number of transfer domain coefficients to feedback for each identified beam and the minimum number of transfer domain coefficients to feedback for each identified beam comprises receiving the maximum number of transfer domain coefficients and the minimum number of transfer domain coefficients via Radio Resource Control (RRC) signaling or Downlink Control Information (DCI).

In an aspect, wherein the maximum number of transfer domain coefficients to feedback for each identified beam is equal to the maximum number of available transfer domain coefficients for the identified beam, and wherein the minimum number of transfer domain coefficients to feedback for each identified beam is equal to zero.

In an aspect, a maximum number of selected transfer domain coefficients to be reported for an identified beam is based at least on a difference between a value of the maximum number of transfer domain coefficients to feedback for each identified beam and a value of the minimum number of transfer domain coefficients to feedback for each identified beam.

In an aspect, a number of bits used for indicating the number of selected transfer domain coefficients associated with an identified beam is based at least on, a ceiling of a logarithmic function, based by 2, of the value of the maximum number of selected transfer domain coefficients to be reported for an identified beam, and wherein a number of bits used for indicating the number of selected transfer domain coefficients for all identified beams is based at least on a multiplication between the number of identified beams and the number of bits used for indicating the number of selected transfer domain coefficients associated with each identified beam.

In an aspect, the reported amplitude and phase information comprises beam-specific amplitude and phase values and coefficient-specific differential amplitude values and differential phase value.

In an aspect, a number of bits used for reporting amplitude and phase information comprises a number of bits for reporting the beam-specific amplitude and phase values, and a number of bits for reporting the coefficient-specific differential amplitude values and differential phase values.

In an aspect, a number of bits used for reporting the beam-specific amplitude and phase values for each selected transfer domain coefficient is based at least on a predefined number of bits to quantize beam-specific amplitude and phase of each identified beam.

In an aspect, a number of bits used for reporting the beam-specific amplitude and phase values for the selected transfer domain coefficients for all identified beams is based at least on a multiplication of the total number of identified beams and the number of bits used for reporting the beam-specific amplitude and phase information for each selected transfer domain coefficient.

In an aspect, for each selected transfer domain coefficient associated with an identified beam, the coefficient-specific differential amplitude and phase values for the selected transfer domain coefficient are based at least on the beam-specific amplitude and phase values respectively associated with the identified beam.

In an aspect, a number of bits used for reporting the coefficient-specific differential amplitude and phase values for each selected transfer domain coefficient is based at least on a predefined number of bits to quantize coefficient-specific differential amplitude and phase values of each transfer domain coefficient.

In an aspect, a number of bits used for reporting the coefficient-specific differential amplitude and phase values for the selected transfer domain coefficients for all beams is based at least on a multiplication of the total number of selected transfer domain coefficients for reporting and a number of bits used for reporting the coefficient-specific differential amplitude and phase values for each selected transfer domain coefficient.

In an aspect, the method further includes for each identified beam, using bit-points, based at least on a look-up table, to indicate locations of the selected transfer domain coefficients within the coefficient compression matrix, associated with the identified beam, wherein the look-up table identifies a plurality of bit-points that identifies respective combinations of locations of the selected transfer domain coefficients within the coefficient compression matrix, associated with the identified beam.

In an aspect, the number of bit-points identified in the look-up table is based at least on a number of combinations for selecting the selected number of transfer domain coefficients from the overall number of coefficients available for each identified beam.

In an aspect, a number of bits used for reporting the bit-point is based at least on, a ceiling of a logarithmic function, based by 2, of the number of bit-points identified in the look-up table, and wherein a number of bits used for reporting the bit-points regarding all identified beams is based at least on, a summation of the numbers of bits used for reporting the bit points associated with all identified beams.

In an aspect, an overall number of coefficients available for each identified beam is based on at least one of a constraint of maximum number of coefficients, or a constraint of a minimum number of coefficients to feedback associated with each identified beam.

In an aspect, the method further includes for all identified beams, using bit-points, based at least on a look-up table, to indicate locations of the set of selected transfer domain coefficients within the coefficient compression matrix, wherein the look-up table identifies a plurality of bit-points that identify respective combinations of locations of the selected transfer domain coefficients within the coefficient compression matrix, associated with all identified beams.

In an aspect, a number of bit-points identified in the look-up table is based at least on multiplication results of all the respective combination numbers associated with all the respective identified beams, for selecting the selected number of transfer domain coefficients from the overall number of coefficients available for each identified beam, wherein a number of bits used for reporting the bit-point is based at least on, a ceiling of a logarithmic function, based by 2, of the number of bit-points identified in the look-up table.

In an aspect, an overall number of coefficients available for each identified beam is based at on least one of a constraint of a maximum number of coefficients or a constraint of a minimum number of coefficients to feedback associated with each identified beam.

Certain aspects provide a method of wireless communications by a Base Station (BS). The method generally includes transmitting reference signals to be used by a User Equipment (UE) for Channel State Information (CSI) feedback to the BS; determining a constraint on a total number of transfer domain coefficients to be reported for compressed CSI feedback by a UE for a plurality of beams identified for the feedback, wherein each transfer domain coefficient is associated with amplitude information and phase information; receiving as part of CSI feedback, wherein the transfer domain is based at least on a set of DFT (Discrete Fourier Transform) bases or a set of DCT (Discrete Cosine Transfer) bases: information indicating a number of transfer domain coefficients in a set of transfer domain coefficients for each beam, the transfer domain coefficients selected from a transfer domain coefficient matrix based on the constraint, a location of each selected transfer domain coefficient within the transfer domain coefficient compression matrix, and at least the amplitude and phase information for the selected coefficients; and adjusting a configuration of one or more antennas of the BS based on the received feedback.

In an aspect, the total number of transfer domain coefficients to be reported by an UE is a fixed value.

In an aspect, the coefficient compression matrix is a coefficient matrix in the transfer domain, wherein the number of rows of the coefficient matrix represents a number of the plurality of the identified beams and the number of columns of the coefficient matrix represents a number of transfer domain coefficients available for each beam, wherein each row corresponds to an identified beam and includes transfer domain coefficients associated with the identified beam, and wherein each element within a particular row represents a coefficient associated with an identified beam corresponding to the particular row.

In an aspect, the selected transfer domain coefficients for each beam includes coefficients with non-zero values from the row corresponding to the beam in the coefficient compression matrix.

In an aspect, amplitude values and phase values in the CSI feedback are sorted in an order based at least on beam indices of the identified beams and further in an order based at least on coefficient indices of the transfer domain coefficients for each beam.

In an aspect, receiving information indicating the number and location comprises for each identified beam, receiving a bit-map with a bit-width equal to the overall number of the transfer domain coefficients available for the identified beam, indicating the number and the locations of the selected transfer domain coefficients for the identified beam.

In an aspect, each bit included in the bit-map indicates whether a corresponding coefficient, of the available coefficients for the identified beam, is included in the set of one or more transfer domain coefficients for the beam.

In an aspect, a number of bits used for bit-maps for all identified beams is based at least on a multiplication between the number of identified beams and a bit-width of each bit-map corresponding to each identified beam.

In an aspect, a number of bits used for indicating the amplitude and phase information for each selected transfer domain coefficient is based at least on a predefined number of bits to quantize amplitude and phase of the transfer domain coefficient.

In an aspect, the number of bits used for indicating the amplitude and phase information for the selected transfer domain coefficients for all beams is based at least on the multiplication of a value of the constraint on the total number of transfer domain coefficients and the number of bits used for reporting the amplitude and phase information for each selected transfer domain coefficient.

In an aspect, the information relating to the location of a transfer domain coefficient associated with an identified beam comprises an index of the transfer domain coefficient associated with the identified beam.

In an aspect, the method further includes configuring a maximum number of transfer domain coefficients to feedback for each identified beam.

In an aspect, configuring the maximum number of transfer domain coefficients to feedback for each identified beam comprises configuring the maximum number of transfer domain coefficients via Radio Resource Control (RRC) signaling or Downlink Control Information (DCI).

In an aspect, the maximum number of transfer domain coefficients to feedback for each identified beam is equal to the maximum number of available transfer domain coefficients for the identified beam.

In an aspect, a number of bits used for indicating the number of selected transfer domain coefficients associated with an identified beam is based at least on a ceiling of a logarithmic function, based by 2, of a value of the maximum number of transfer domain coefficients to feedback for each identified beam, and wherein a number of bits used for indicating the number of selected transfer domain coefficients for all identified beam is based at least on the multiplication between the number of bits used for indicating the number of selected transfer domain coefficients associated with each identified beam, and the number of identified beams.

In an aspect, the method further includes for each identified beam, receiving a plurality of sets of bits explicitly indicating indices of the selected transfer domain coefficients associated with the identified beam, wherein each set of bits indicates a respective index of a selected coefficient associated with the identified beam.

In an aspect, a number of bits within a set of bits used for indicating a particular coefficient is based at least on, a ceiling of a logarithmic function, based by 2, of an overall number of coefficients available for each identified beam, wherein a number of bits used for the plurality of sets of bits to indicate the indices of the selected transfer domain coefficients associated with the identified beam is based at least on a multiplication between a number of selected transfer domain coefficients associated with the beam, and the number of bits within a set of bits, and wherein a number of bits used for indicating indices of the selected transfer domain coefficients for all identified beams is based on a summation of the number of bits used for indicating transfer domain coefficients for each identified beam.

In an aspect, the method further includes configuring a maximum number of transfer domain coefficients and a minimum number of transfer domain coefficients to feedback for each identified beam.

In an aspect, configuring the maximum number of transfer domain coefficients to feedback for each identified beam and the minimum number of transfer domain coefficients to feedback for each identified beam comprises configuring the maximum number of transfer domain coefficients and the minimum number of transfer domain coefficients via Radio Resource Control (RRC) signaling or Downlink Control Information (DCI).

In an aspect, the maximum number of transfer domain coefficients to feedback for each identified beam is equal to the maximum number of available transfer domain coefficients for the identified beam, and wherein the minimum number of transfer domain coefficients to feedback for each identified beam is equal to zero.

In an aspect, a maximum number of selected transfer domain coefficients to be determined for an identified beam is based at least on a difference between a value of the maximum number of transfer domain coefficients to feedback for each identified beam and a value of the minimum number of transfer domain coefficients to feedback for each identified beam.

In an aspect, a number of bits used for indicating the number of selected transfer domain coefficients associated with an identified beam is based at least on, a ceiling of a logarithmic function, based by 2, of the value of the maximum number of selected transfer domain coefficients to be reported for an identified beam, and wherein a number of bits used for indicating the number of selected transfer domain coefficients for all identified beams is based at least on a multiplication between the number of identified beams and the number of bits used for indicating the number of selected transfer domain coefficients associated with each identified beam.

In an aspect, the reported amplitude and phase information comprises beam-specific amplitude and phase values and coefficient-specific differential amplitude values and differential phase value.

In an aspect, a number of bits used for indicating amplitude and phase information comprises a number of bits for indicating the beam-specific amplitude and phase values, and a number of bits for reporting the coefficient-specific differential amplitude values and differential phase values.

In an aspect, a number of bits used for indicating the beam-specific amplitude and phase values for each selected transfer domain coefficient is based at least on a predefined number of bits to quantize beam-specific amplitude and phase of each identified beam.

In an aspect, a number of bits used for indicating the beam-specific amplitude and phase values for the selected transfer domain coefficients for all identified beams is based at least on a multiplication of the total number of identified beams and the number of bits used for indicating the beam-specific amplitude and phase information for each selected transfer domain coefficient.

In an aspect, for each selected transfer domain coefficient associated with an identified beam, the coefficient-specific differential amplitude and phase values for the selected transfer domain coefficient are based at least on the beam-specific amplitude and phase values respectively associated with the identified beam.

In an aspect, a number of bits used for indicating the coefficient-specific differential amplitude and phase values for each selected transfer domain coefficient is based at least on a predefined number of bits to quantize coefficient-specific differential amplitude and phase values of each transfer domain coefficient.

In an aspect, a number of bits used for indicating the coefficient-specific differential amplitude and phase values for the selected transfer domain coefficients for all beams is based at least on a multiplication of the total number of selected transfer domain coefficients for reporting and a number of bits used for reporting the coefficient-specific differential amplitude and phase values for each selected transfer domain coefficient.

In an aspect, the method further includes for each identified beam, determining a bit-point, based at least on a look-up table, to indicate locations of the selected transfer domain coefficients within the coefficient compression matrix, associated with the identified beam, wherein the look-up table identifies a plurality of bit-points that identifies respective combinations of locations of the selected transfer domain coefficients within the coefficient compression matrix, associated with the identified beam.

In an aspect, the number of bit-points identified in the look-up table is based at least on a number of combinations for selecting the selected number of transfer domain coefficients from the overall number of coefficients available for each identified beam.

In an aspect, a number of bits used for indicating the bit-point is based at least on, a ceiling of a logarithmic function, based by 2, of the number of bit-points identified in the look-up table, and wherein a number of bits used for reporting the bit-points regarding all identified beams is based at least on, a summation of the numbers of bits used for reporting the bit points associated with all identified beams.

In an aspect, an overall number of coefficients available for each identified beam is based on at least one of a constraint of maximum number of coefficients, or a constraint of a minimum number of coefficients to feedback associated with each identified beam.

In an aspect, the method further includes for all identified beams, determining a bit-point, based at least on a look-up table, to indicate locations of the set of selected transfer domain coefficients within the coefficient compression matrix, wherein the look-up table identifies a plurality of bit-points that identify respective combinations of locations of the selected transfer domain coefficients within the coefficient compression matrix, associated with all identified beams.

In an aspect, a number of bit-points identified in the look-up table is based at least on multiplication results of all the respective combination numbers associated with all the respective identified beams, for selecting the selected number of transfer domain coefficients from the overall number of coefficients available for each identified beam, wherein a number of bits used for reporting the bit-point is based at least on, a ceiling of a logarithmic function, based by 2, of the number of bit-points identified in the look-up table.

In an aspect, an overall number of coefficients available for each identified beam is based at on least one of a constraint of a maximum number of coefficients or a constraint of a minimum number of coefficients to feedback associated with each identified beam.

Certain aspects provide an apparatus for wireless communications by a User Equipment (UE). The apparatus generally includes at least one processor and a memory coupled to the at least one processor. The at least one processor is generally configured to determine a constraint on a total number of transfer domain coefficients to be reported for compressed Channel State Information (CSI) feedback by the UE for a plurality of beams identified for the feedback, wherein each transfer domain coefficient is associated with amplitude information and phase information, wherein the transfer domain is based at least on a set of DFT (Discrete Fourier Transform) bases or a set of DCT (Discrete Cosine Transfer) bases; select from a transfer domain coefficient compression matrix, based on the constraint, a set of one or more transfer domain coefficients to report for each of the beams; report information indicating a number of selected transfer domain coefficients in the set of transfer domain coefficients for each beam and a location of each transfer domain coefficient within the transfer domain coefficient compression matrix; and report at least the amplitude and phase information for the selected coefficients.

Certain aspects provide an apparatus for wireless communications by a Base Station (BS). The apparatus generally includes at least one processor and a memory coupled to the at least one processor. The at least one processor is generally configured to transmit reference signals to be used by a User Equipment (UE) for Channel State Information (CSI) feedback to the BS; determine a constraint on a total number of transfer domain coefficients to be reported for compressed CSI feedback by a UE for a plurality of beams identified for the feedback, wherein each transfer domain coefficient is associated with amplitude information and phase information, wherein the transfer domain is based at least on a set of DFT (Discrete Fourier Transform) bases or a set of DCT (Discrete Cosine Transfer) bases; receive as part of CSI feedback: information indicating a number of transfer domain coefficients in a set of transfer domain coefficients for each beam, the transfer domain coefficients selected from a transfer domain coefficient matrix based on the constraint, a location of each selected transfer domain coefficient within the transfer domain coefficient compression matrix, and at least the amplitude and phase information for the selected coefficients; and adjust a configuration of one or more antennas of the BS based on the received feedback.

Aspects generally include methods, apparatus, systems, computer readable mediums, and processing systems, as substantially described herein with reference to and as illustrated by the accompanying drawings.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

To the accomplishment of the foregoing and related ends, the one or more aspects comprise the features hereinafter fully described and particularly pointed out in the claims. The following description and the appended drawings set forth in detail certain illustrative features of the one or more aspects. These features are indicative, however, of but a few of the various ways in which the principles of various aspects may be employed.

DETAILED DESCRIPTION

Figure 8:
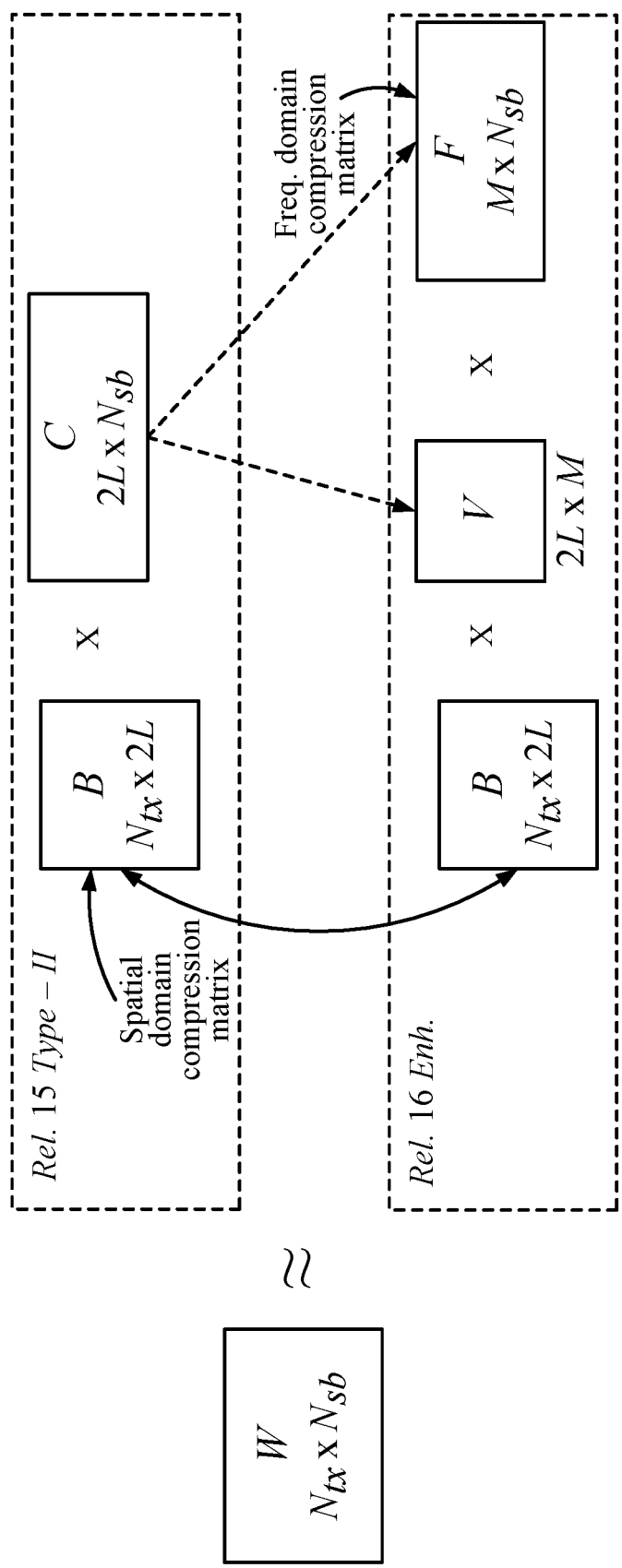
FIG. 8 illustrates an example compression of the 3GPP Rel. 15 Type II CSI feedback as being proposed for 3GPP Rel. 16, in accordance with certain aspects of the present disclosure.

In 3GPP's Rel. 16, it has been proposed that a constraint on the overall number of coefficients in the transferred domain (e.g., DFT basis domain), represented by $M_{total}$ (represented by the total number of non-zero coefficients in the coefficient compression matrix V shown in FIG. 8), associated with all spatial beams identified for feedback, may be configured for a UE (e.g., by the network) as a parameter known to both the UE and the network. Thus, this configuration becomes an initial constraint for the UE to select the non-zero coefficients to feedback in the transferred domain. In an aspect, such a constraint allows the UE to select different numbers of coefficients associated with different spatial beams. In other words, the UE, based on the constraint on the total number of coefficients to be reported, may decide to have different numbers of non-zero entries for different rows of the coefficient compression matrix V. This makes the compression of the Rel. 15 coefficient set more flexible at the UE end.

However, the detailed configurations and related feedback schemes for reporting the transfer domain coefficients (e.g., from the coefficient compression matrix V) have not been proposed in Rel. 16, when the overall number of transfer domain coefficients ($M_{total}$) to feedback in the transferred domain (e.g., DFT domain) is configured for the UE by the network.

Certain aspects of the present disclosure discuss several configurations and related feedback schemes for a UE to report transfer domain coefficients from a coefficient compression matrix (e.g., matrix V of FIG. 8) as part of CSI feedback, when the overall number of transfer domain coefficients ($M_{total}$) to feedback in the transferred domain is a configured parameter.

So that the manner in which the above-recited features of the present disclosure can be understood in detail, a more particular description, briefly summarized above, may be had by reference to aspects, some of which are illustrated in the drawings. It is to be noted, however, that the appended drawings illustrate only certain typical aspects of this disclosure and are therefore not to be considered limiting of its scope, for the description may admit to other equally effective aspects.

The following description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim. The word "exemplary" is used herein to mean "serving as an example, instance, or illustration." Any aspect described herein as "exemplary" is not necessarily to be construed as preferred or advantageous over other aspects.

The techniques described herein may be used for various wireless communication technologies, such as LTE, CDMA, TDMA, FDMA, OFDMA, SC-FDMA and other networks. The terms "network" and "system" are often used interchangeably. A CDMA network may implement a radio technology such as Universal Terrestrial Radio Access (UTRA), cdma2000, etc. UTRA includes Wideband CDMA (WCDMA) and other variants of CDMA. cdma2000 covers IS-2000, IS-95 and IS-856 standards. A TDMA network may implement a radio technology such as Global System for Mobile Communications (GSM). An OFDMA network may implement a radio technology such as NR (e.g. 5G RA), Evolved UTRA (E-UTRA), Ultra Mobile Broadband (UMB), IEEE 802.11 (Wi-Fi), IEEE 802.16 (WiMAX), IEEE 802.20, Flash-OFDMA, etc. UTRA and E-UTRA are part of Universal Mobile Telecommunication System (UMTS).

New Radio (NR) is an emerging wireless communications technology under development in conjunction with the 5G Technology Forum (5GTF). 3GPP Long Term Evolution (LTE) and LTE-Advanced (LTE-A) are releases of UMTS that use E-UTRA. UTRA, E-UTRA, UMTS, LTE, LTE-A and GSM are described in documents from an organization named "3rd Generation Partnership Project" (3GPP). cdma2000 and UMB are described in documents from an organization named "3rd Generation Partnership Project 2" (3GPP2). The techniques described herein may be used for the wireless networks and radio technologies mentioned above as well as other wireless networks and radio technologies. For clarity, while aspects may be described herein using terminology commonly associated with 3G and/or 4G wireless technologies, aspects of the present disclosure can be applied in other generation-based communication systems, such as 5G and later, including NR technologies.

New radio (NR) access (e.g., 5G technology) may support various wireless communication services, such as enhanced mobile broadband (eMBB) targeting wide bandwidth (e.g., 80 MHz or beyond), millimeter wave (mmW) targeting high carrier frequency (e.g., 25 GHz or beyond), massive machine type communications MTC (mMTC) targeting non-backward compatible MTC techniques, and/or mission critical targeting ultra-reliable low-latency communications (URLLC). These services may include latency and reliability requirements. These services may also have different transmission time intervals (TTI) to meet respective quality of service (QoS) requirements. In addition, these services may co-exist in the same subframe.

Example Wireless Communications System

Figure 1:
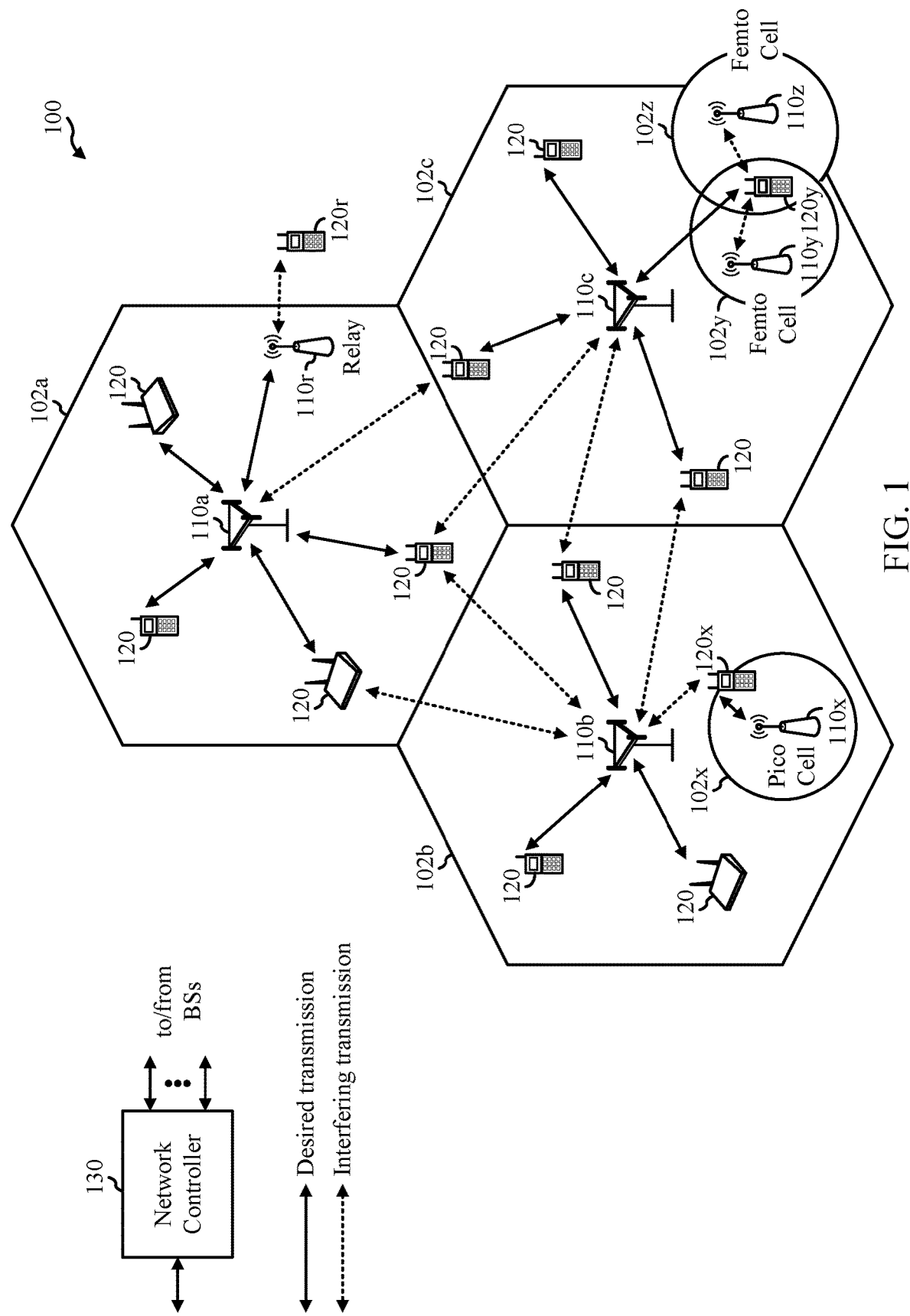
FIG. 1 is a block diagram conceptually illustrating an example telecommunications system.

FIG. 1 illustrates an example wireless communication network 100 in which aspects of the present disclosure may be performed. For example, the wireless communication network 100 may be a New Radio (NR) or 5G network. In another example, the wireless communication network 100 may be an LTE network.

As illustrated in FIG. 1, the wireless network 100 may include a number of base stations (BSs) 110 and other network entities. A BS may be a station that communicates with user equipments (UEs). Each BS 110 may provide communication coverage for a particular geographic area. In 3GPP, the term "cell" can refer to a coverage area of a Node B (NB) and/or a Node B subsystem serving this coverage area, depending on the context in which the term is used. In NR systems, the term "cell" and next generation NodeB (gNB), new radio base station (NR BS), 5G NB, access point (AP), or transmission reception point (TRP) may be interchangeable. In some examples, a cell may not necessarily be stationary, and the geographic area of the cell may move according to the location of a mobile BS. In some examples, the base stations may be interconnected to one another and/or to one or more other base stations or network nodes (not shown) in wireless communication network 100 through various types of backhaul interfaces, such as a direct physical connection, a wireless connection, a virtual network, or the like using any suitable transport network.

In general, any number of wireless networks may be deployed in a given geographic area. Each wireless network may support a particular radio access technology (RAT) and may operate on one or more frequencies. A RAT may also be referred to as a radio technology, an air interface, etc. A frequency may also be referred to as a carrier, a subcarrier, a frequency channel, a tone, a subband, etc. Each frequency may support a single RAT in a given geographic area in order to avoid interference between wireless networks of different RATs. In some cases, NR or 5G RAT networks may be deployed.

A base station (BS) may provide communication coverage for a macro cell, a pico cell, a femto cell, and/or other types of cells. A macro cell may cover a relatively large geographic area (e.g., several kilometers in radius) and may allow unrestricted access by UEs with service subscription. A pico cell may cover a relatively small geographic area and may allow unrestricted access by UEs with service subscription. A femto cell may cover a relatively small geographic area (e.g., a home) and may allow restricted access by UEs having an association with the femto cell (e.g., UEs in a Closed Subscriber Group (CSG), UEs for users in the home, etc.). A BS for a macro cell may be referred to as a macro BS. A BS for a pico cell may be referred to as a pico BS. A BS for a femto cell may be referred to as a femto BS or a home BS. In the example shown in FIG. 1, the BSs 110a, 110b and 110c may be macro BSs for the macro cells 102a, 102b and 102c, respectively. The BS 110x may be a pico BS for a pico cell 102x. The BSs 110y and 110z may be femto BSs for the femto cells 102y and 102z, respectively. A BS may support one or multiple (e.g., three) cells.

Wireless communication network 100 may also include relay stations. A relay station is a station that receives a transmission of data and/or other information from an upstream station (e.g., a BS or a UE) and sends a transmission of the data and/or other information to a downstream station (e.g., a UE or a BS). A relay station may also be a UE that relays transmissions for other UEs. In the example shown in FIG. 1, a relay station 110r may communicate with the BS 110a and a UE 120r in order to facilitate communication between the BS 110a and the UE 120r. A relay station may also be referred to as a relay BS, a relay, etc.

Wireless network 100 may be a heterogeneous network that includes BSs of different types, e.g., macro BS, pico BS, femto BS, relays, etc. These different types of BSs may have different transmit power levels, different coverage areas, and different impact on interference in the wireless network 100. For example, macro BS may have a high transmit power level (e.g., 20 Watts) whereas pico BS, femto BS, and relays may have a lower transmit power level (e.g., 1 Watt).

Wireless communication network 100 may support synchronous or asynchronous operation. For synchronous operation, the BSs may have similar frame timing, and transmissions from different BSs may be approximately aligned in time. For asynchronous operation, the BSs may have different frame timing, and transmissions from different BSs may not be aligned in time. The techniques described herein may be used for both synchronous and asynchronous operation.

A network controller 130 may couple to a set of BSs and provide coordination and control for these BSs. The network controller 130 may communicate with the BSs 110 via a backhaul. The BSs 110 may also communicate with one another (e.g., directly or indirectly) via wireless or wireline backhaul.

The UEs 120 (e.g., 120x, 120y, etc.) may be dispersed throughout the wireless network 100, and each UE may be stationary or mobile. A UE may also be referred to as a mobile station, a terminal, an access terminal, a subscriber unit, a station, a Customer Premises Equipment (CPE), a cellular phone, a smart phone, a personal digital assistant (PDA), a wireless modem, a wireless communication device, a handheld device, a laptop computer, a cordless phone, a wireless local loop (WLL) station, a tablet computer, a camera, a gaming device, a netbook, a smartbook, an ultrabook, an appliance, a medical device or medical equipment, a biometric sensor/device, a wearable device such as a smart watch, smart clothing, smart glasses, a smart wrist band, smart jewelry (e.g., a smart ring, a smart bracelet, etc.), an entertainment device (e.g., a music device, a video device, a satellite radio, etc.), a vehicular component or sensor, a smart meter/sensor, industrial manufacturing equipment, a global positioning system device, or any other suitable device that is configured to communicate via a wireless or wired medium. Some UEs may be considered machine-type communication (MTC) devices or evolved MTC (eMTC) devices. MTC and eMTC UEs include, for example, robots, drones, remote devices, sensors, meters, monitors, location tags, etc., that may communicate with a BS, another device (e.g., remote device), or some other entity. A wireless node may provide, for example, connectivity for or to a network (e.g., a wide area network such as Internet or a cellular network) via a wired or wireless communication link. Some UEs may be considered Internet-of-Things (IoT) devices, which may be narrowband IoT (NB-IoT) devices.

Certain wireless networks (e.g., LTE) utilize orthogonal frequency division multiplexing (OFDM) on the downlink and single-carrier frequency division multiplexing (SC-FDM) on the uplink. OFDM and SC-FDM partition the system bandwidth into multiple (K) orthogonal subcarriers, which are also commonly referred to as tones, bins, etc. Each subcarrier may be modulated with data. In general, modulation symbols are sent in the frequency domain with OFDM and in the time domain with SC-FDM. The spacing between adjacent subcarriers may be fixed, and the total number of subcarriers (K) may be dependent on the system bandwidth. For example, the spacing of the subcarriers may be 15 kHz and the minimum resource allocation (called a "resource block" (RB)) may be 12 subcarriers (or 180 kHz). Consequently, the nominal Fast Fourier Transfer (FFT) size may be equal to 128, 256, 512, 1024 or 2048 for system bandwidth of 1.25, 2.5, 5, 10, or 20 megahertz (MHz), respectively. The system bandwidth may also be partitioned into subbands. For example, a subband may cover 1.08 MHz (i.e., 6 resource blocks), and there may be 1, 2, 4, 8, or 16 subbands for system bandwidth of 1.25, 2.5, 5, 10 or 20 MHz, respectively.

While aspects of the examples described herein may be associated with LTE technologies, aspects of the present disclosure may be applicable with other wireless communications systems, such as NR. NR may utilize OFDM with a CP on the uplink and downlink and include support for half-duplex operation using TDD. Beamforming may be supported and beam direction may be dynamically configured. MIMO transmissions with precoding may also be supported. MIMO configurations in the DL may support up to 8 transmit antennas with multi-layer DL transmissions up to 8 streams and up to 2 streams per UE. Multi-layer transmissions with up to 2 streams per UE may be supported. Aggregation of multiple cells may be supported with up to 8 serving cells.

In some examples, access to the air interface may be scheduled, wherein a. A scheduling entity (e.g., a base station) allocates resources for communication among some or all devices and equipment within its service area or cell. The scheduling entity may be responsible for scheduling, assigning, reconfiguring, and releasing resources for one or more subordinate entities. That is, for scheduled communication, subordinate entities utilize resources allocated by the scheduling entity. Base stations are not the only entities that may function as a scheduling entity. In some examples, a UE may function as a scheduling entity and may schedule resources for one or more subordinate entities (e.g., one or more other UEs), and the other UEs may utilize the resources scheduled by the UE for wireless communication. In some examples, a UE may function as a scheduling entity in a peer-to-peer (P2P) network, and/or in a mesh network. In a mesh network example, UEs may communicate directly with one another in addition to communicating with a scheduling entity.

In FIG. 1, a solid line with double arrows indicates desired transmissions between a UE and a serving BS, which is a BS designated to serve the UE on the downlink and/or uplink. A finely dashed line with double arrows indicates interfering transmissions between a UE and a BS.

Figure 2:
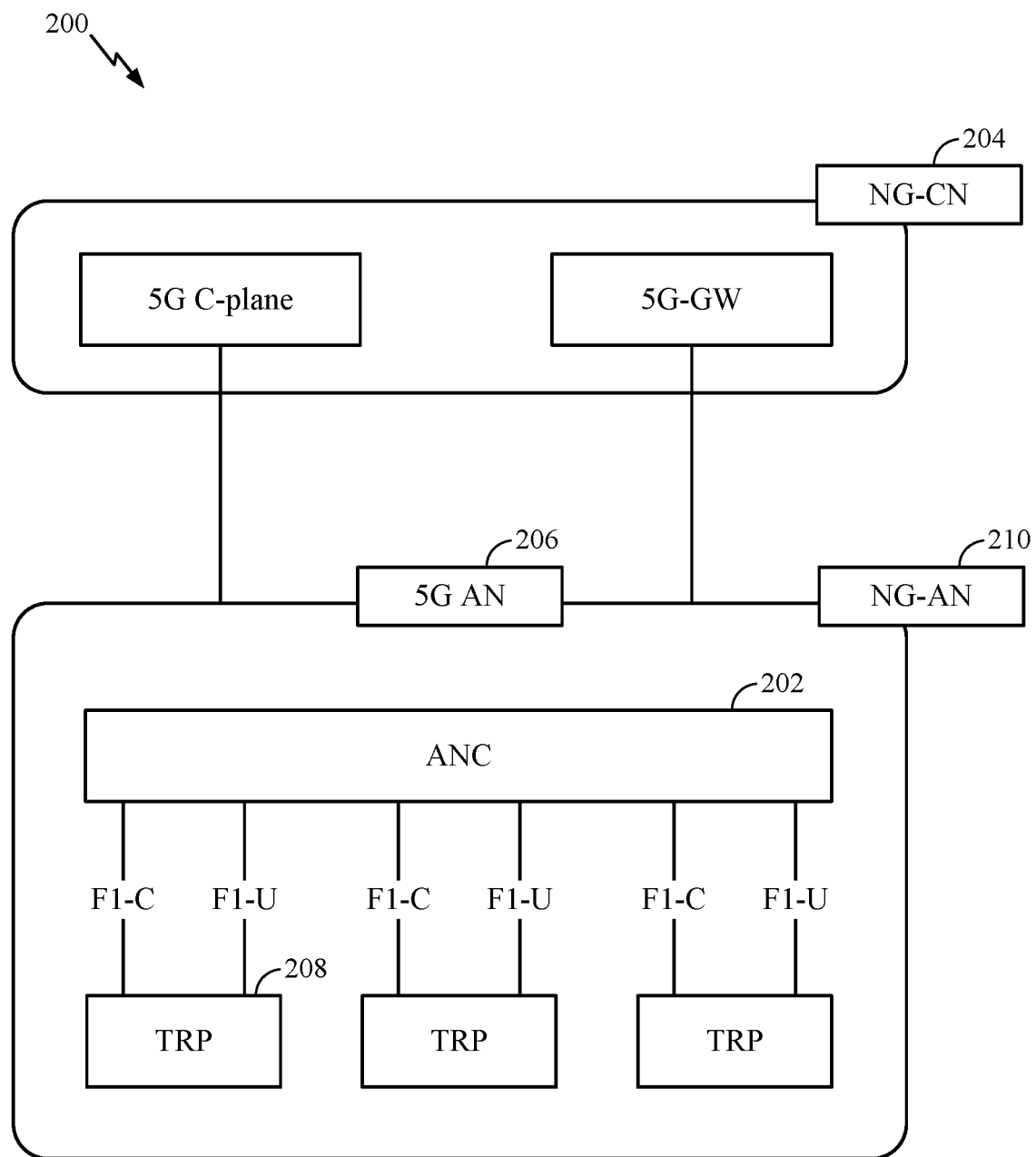
FIG. 2 is a block diagram illustrating an example logical architecture of a distributed radio access network (RAN).

FIG. 2 illustrates an example logical architecture of a distributed Radio Access Network (RAN) 200, which may be implemented in the wireless communication network 100 illustrated in FIG. 1. A 5G access node 206 may include an access node controller (ANC) 202. ANC 202 may be a central unit (CU) of the distributed RAN 200. The backhaul interface to the Next Generation Core Network (NG-CN) 204 may terminate at ANC 202. The backhaul interface to neighboring next generation access Nodes (NG-ANs) 210 may terminate at ANC 202. ANC 202 may include one or more transmission reception points (TRPs) 208 (e.g., cells, BSs, gNBs, etc.).

The TRPs 208 may be a distributed unit (DU). TRPs 208 may be connected to a single ANC (e.g., ANC 202) or more than one ANC (not illustrated). For example, for RAN sharing, radio as a service (RaaS), and service specific AND deployments, TRPs 208 may be connected to more than one ANC. TRPs 208 may each include one or more antenna ports. TRPs 208 may be configured to individually (e.g., dynamic selection) or jointly (e.g., joint transmission) serve traffic to a UE.

The logical architecture of distributed RAN 200 may support fronthauling solutions across different deployment types. For example, the logical architecture may be based on transmit network capabilities (e.g., bandwidth, latency, and/or jitter).

The logical architecture of distributed RAN 200 may share features and/or components with LTE. For example, next generation access node (NG-AN) 210 may support dual connectivity with NR and may share a common fronthaul for LTE and NR.

The logical architecture of distributed RAN 200 may enable cooperation between and among TRPs 208, for example, within a TRP and/or across TRPs via ANC 202. An inter-TRP interface may not be used.

Logical functions may be dynamically distributed in the logical architecture of distributed RAN 200. As will be described in more detail with reference to FIG. 5, the Radio Resource Control (RRC) layer, Packet Data Convergence Protocol (PDCP) layer, Radio Link Control (RLC) layer, Medium Access Control (MAC) layer, and a Physical (PHY) layers may be adaptably placed at the DU (e.g., TRP 208) or CU (e.g., ANC 202).

Figure 3:
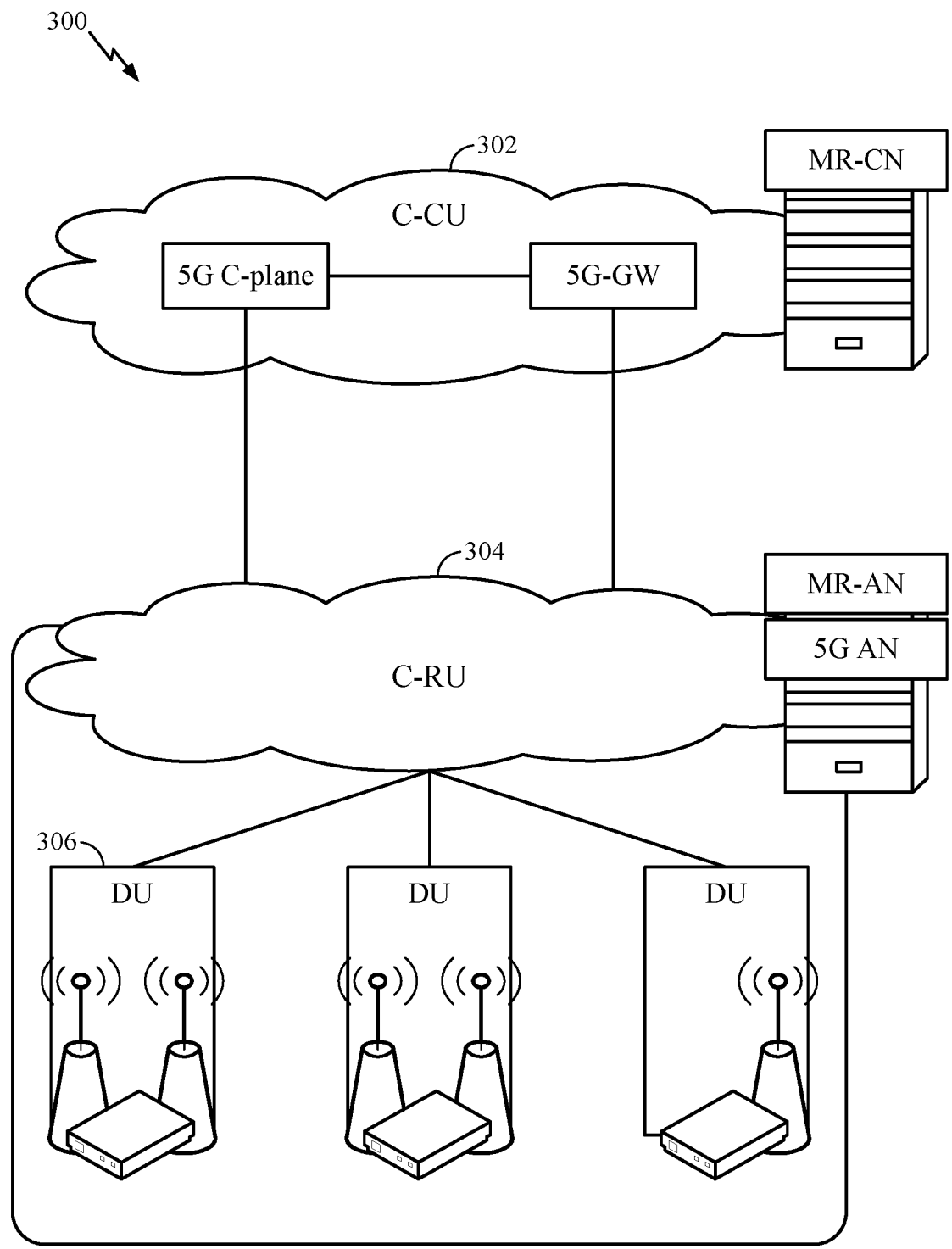
FIG. 3 is a diagram illustrating an example physical architecture of a distributed RAN.

FIG. 3 illustrates an example physical architecture of a distributed Radio Access Network (RAN) 300, according to aspects of the present disclosure. A centralized core network unit (C-CU) 302 may host core network functions. C-CU 302 may be centrally deployed. C-CU 302 functionality may be offloaded (e.g., to advanced wireless services (AWS)), in an effort to handle peak capacity.

A centralized RAN unit (C-RU) 304 may host one or more ANC functions. Optionally, the C-RU 304 may host core network functions locally. The C-RU 304 may have distributed deployment. The C-RU 304 may be close to the network edge.

A DU 306 may host one or more TRPs (Edge Node (EN), an Edge Unit (EU), a Radio Head (RH), a Smart Radio Head (SRH), or the like). The DU may be located at edges of the network with radio frequency (RF) functionality.

Figure 4:
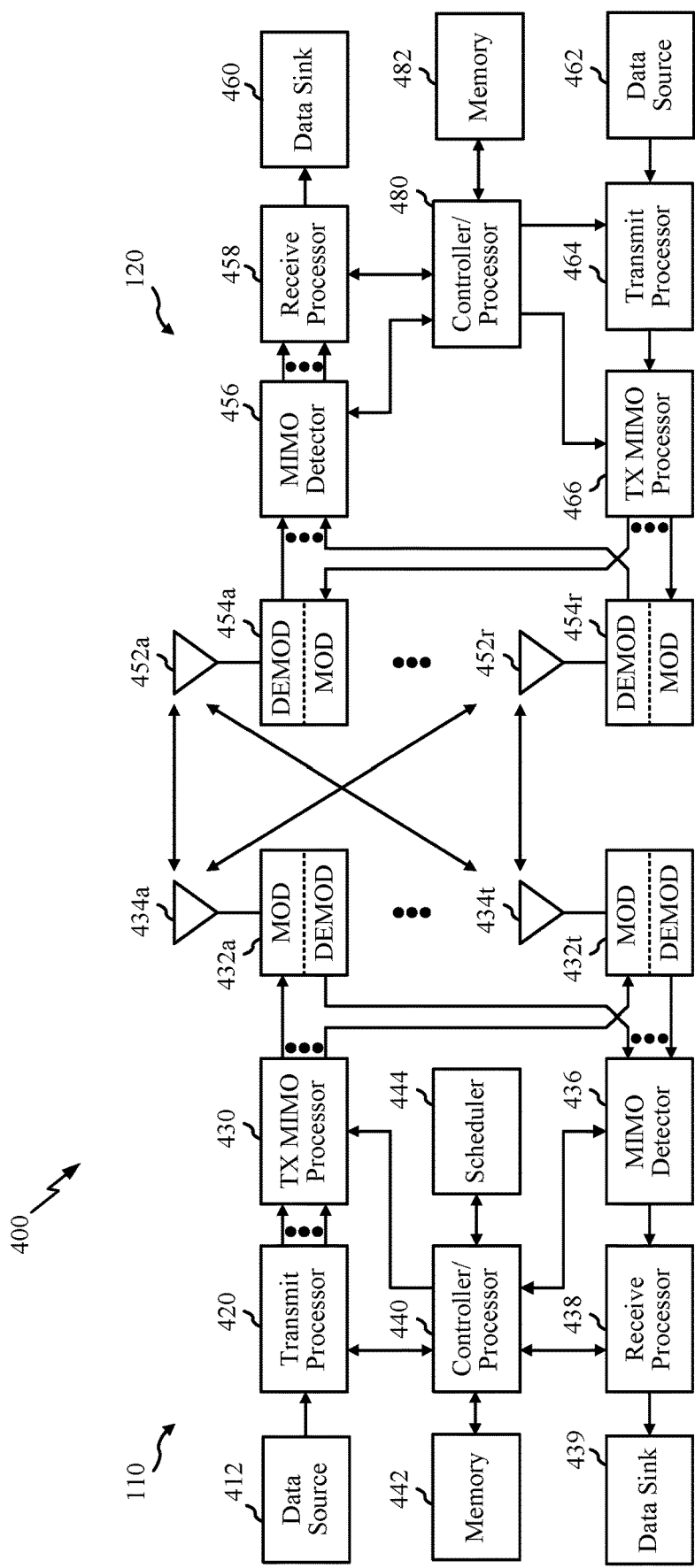
FIG. 4 is a block diagram conceptually illustrating a design of an example base station (BS) and user equipment (UE).

FIG. 4 illustrates example components of BS 110 and UE 120 (as depicted in FIG. 1), which may be used to implement aspects of the present disclosure. For example, antennas 452, processors 466, 458, 464, and/or controller/processor 480 of the UE 120 and/or antennas 434, processors 420, 460, 438, and/or controller/processor 440 of the BS 110 may be used to perform the various techniques and methods described herein (e.g., operations described in FIGS. 9-10).

At the BS 110, a transmit processor 420 may receive data from a data source 412 and control information from a controller/processor 440. The control information may be for the physical broadcast channel (PBCH), physical control format indicator channel (PCFICH), physical hybrid ARQ indicator channel (PHICH), physical downlink control channel (PDCCH), group common PDCCH (GC PDCCH), etc. The data may be for the physical downlink shared channel (PDSCH), etc. The processor 420 may process (e.g., encode and symbol map) the data and control information to obtain data symbols and control symbols, respectively. The processor 420 may also generate reference symbols, e.g., for the primary synchronization signal (PSS), secondary synchronization signal (SSS), and cell-specific reference signal (CRS). A transmit (TX) multiple-input multiple-output (MIMO) processor 430 may perform spatial processing (e.g., precoding) on the data symbols, the control symbols, and/or the reference symbols, if applicable, and may provide output symbol streams to the modulators (MODs) 432a through 432t. Each modulator 432 may process a respective output symbol stream (e.g., for OFDM, etc.) to obtain an output sample stream. Each modulator may further process (e.g., convert to analog, amplify, filter, and upconvert) the output sample stream to obtain a downlink signal. Downlink signals from modulators 432a through 432t may be transmitted via the antennas 434a through 434t, respectively.

At the UE 120, the antennas 452a through 452r may receive the downlink signals from the base station 110 and may provide received signals to the demodulators (DE-MODs) in transceivers 454a through 454r, respectively. Each demodulator 454 may condition (e.g., filter, amplify, downconvert, and digitize) a respective received signal to obtain input samples. Each demodulator may further process the input samples (e.g., for OFDM, etc.) to obtain received symbols. A MIMO detector 456 may obtain received symbols from all the demodulators 454a through 454r, perform MIMO detection on the received symbols if applicable, and provide detected symbols. A receive processor 458 may process (e.g., demodulate, deinterleave, and decode) the detected symbols, provide decoded data for the UE 120 to a data sink 460, and provide decoded control information to a controller/processor 480.

On the uplink, at UE 120, a transmit processor 464 may receive and process data (e.g., for the physical uplink shared channel (PUSCH)) from a data source 462 and control information (e.g., for the physical uplink control channel (PUCCH) from the controller/processor 480. The transmit processor 464 may also generate reference symbols for a reference signal (e.g., for the sounding reference signal (SRS)). The symbols from the transmit processor 464 may be precoded by a TX MIMO processor 466 if applicable, further processed by the demodulators in transceivers 454a through 454r (e.g., for SC-FDM, etc.), and transmitted to the base station 110. At the BS 110, the uplink signals from the UE 120 may be received by the antennas 434, processed by the modulators 432, detected by a MIMO detector 436 if applicable, and further processed by a receive processor 438 to obtain decoded data and control information sent by the UE 120. The receive processor 438 may provide the decoded data to a data sink 439 and the decoded control information to the controller/processor 440.

The controllers/processors 440 and 480 may direct the operation at the base station 110 and the UE 120, respectively. The processor 440 and/or other processors and modules at the BS 110 may perform or direct the execution of processes for the techniques described herein. The memories 442 and 482 may store data and program codes for BS 110 and UE 120, respectively. A scheduler 444 may schedule UEs for data transmission on the downlink and/or uplink.

Figure 5:
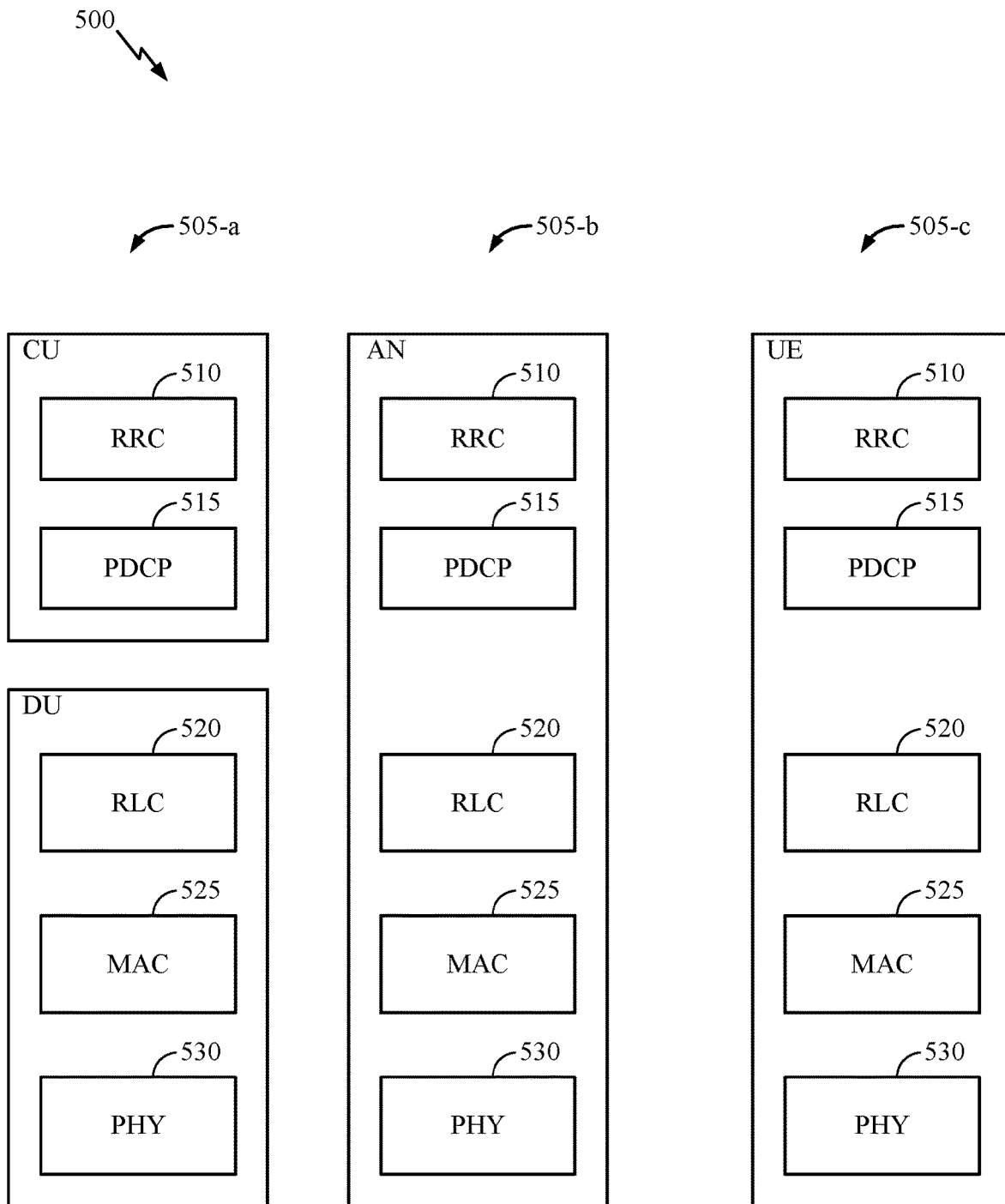
FIG. 5 is a diagram showing examples for implementing a communication protocol stack.

FIG. 5 illustrates a diagram 500 showing examples for implementing a communications protocol stack, according to aspects of the present disclosure. The illustrated communications protocol stacks may be implemented by devices operating in a wireless communication system, such as a 5G system (e.g., a system that supports uplink-based mobility). Diagram 500 illustrates a communications protocol stack including a Radio Resource Control (RRC) layer 510, a Packet Data Convergence Protocol (PDCP) layer 515, a Radio Link Control (RLC) layer 520, a Medium Access Control (MAC) layer 525, and a Physical (PHY) layer 530. In various examples, the layers of a protocol stack may be implemented as separate modules of software, portions of a processor or ASIC, portions of non-collocated devices connected by a communications link, or various combinations thereof. Collocated and non-collocated implementations may be used, for example, in a protocol stack for a network access device (e.g., ANs, CUs, and/or DUs) or a UE.

A first option 505-a shows a split implementation of a protocol stack, in which implementation of the protocol stack is split between a centralized network access device (e.g., an ANC 202 in FIG. 2) and distributed network access device (e.g., DU 208 in FIG. 2). In the first option 505-a, an RRC layer 510 and a PDCP layer 515 may be implemented by the central unit, and an RLC layer 520, a MAC layer 525, and a PHY layer 530 may be implemented by the DU. In various examples the CU and the DU may be collocated or non-collocated. The first option 505-a may be useful in a macro cell, micro cell, or pico cell deployment.

A second option 505-b shows a unified implementation of a protocol stack, in which the protocol stack is implemented in a single network access device. In the second option, RRC layer 510, PDCP layer 515, RLC layer 520, MAC layer 525, and PHY layer 530 may each be implemented by the AN. The second option 505-b may be useful in, for example, a femto cell deployment.

Regardless of whether a network access device implements part or all of a protocol stack, a UE may implement an entire protocol stack as shown in 505-c (e.g., the RRC layer 510, the PDCP layer 515, the RLC layer 520, the MAC layer 525, and the PHY layer 530).

In LTE, the basic transmission time interval (TTI) or packet duration is the 1 ms subframe. In NR, a subframe is still 1 ms, but the basic TTI is referred to as a slot. A subframe contains a variable number of slots (e.g., 1, 2, 4, 8, 16, . . . slots) depending on the subcarrier spacing. The NR RB is 12 consecutive frequency subcarriers. NR may support a base subcarrier spacing of 15 KHz and other subcarrier spacing may be defined with respect to the base subcarrier spacing, for example, 30 kHz, 60 kHz, 120 kHz, 240 kHz, etc. The symbol and slot lengths scale with the subcarrier spacing. The CP length also depends on the subcarrier spacing.

Figure 6:
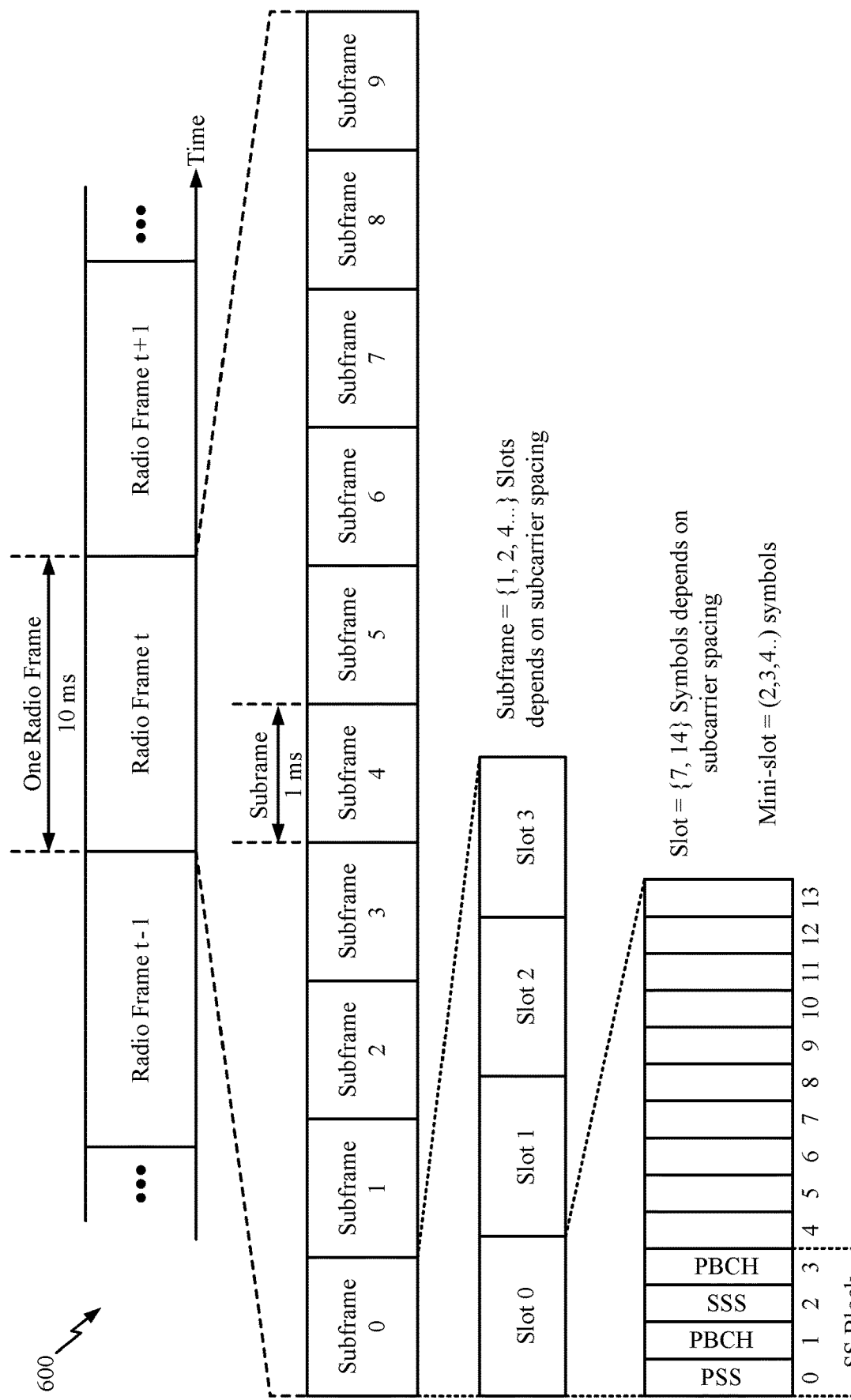
FIG. 6 illustrates an example of a frame format for a new radio (NR) system.

FIG. 6 is a diagram showing an example of a frame format 600 for NR. The transmission timeline for each of the downlink and uplink may be partitioned into units of radio frames. Each radio frame may have a predetermined duration (e.g., 10 ms) and may be partitioned into 10 subframes, each of 1 ms, with indices of 0 through 9. Each subframe may include a variable number of slots depending on the subcarrier spacing. Each slot may include a variable number of symbol periods (e.g., 7 or 14 symbols) depending on the subcarrier spacing. The symbol periods in each slot may be assigned indices. A mini-slot is a subslot structure (e.g., 2, 3, or 4 symbols).

Each symbol in a slot may indicate a link direction (e.g., DL, UL, or flexible) for data transmission and the link direction for each subframe may be dynamically switched. The link directions may be based on the slot format. Each slot may include DL/UL data as well as DL/UL control information.

In NR, a synchronization signal (SS) block is transmitted. The SS block includes a PSS, a SSS, and a two symbol PBCH. The SS block can be transmitted in a fixed slot location, such as the symbols 0-3 as shown in FIG. 6. The PSS and SSS may be used by UEs for cell search and acquisition. The PSS may provide half-frame timing, the SS may provide the CP length and frame timing. The PSS and SSS may provide the cell identity. The PBCH carries some basic system information, such as downlink system bandwidth, timing information within radio frame, SS burst set periodicity, system frame number, etc. The SS blocks may be organized into SS bursts to support beam sweeping. Further system information such as, remaining minimum system information (RMSI), system information blocks (SIBs), other system information (OSI) can be transmitted on a physical downlink shared channel (PDSCH) in certain subframes.

In some circumstances, two or more subordinate entities (e.g., UEs) may communicate with each other using sidelink signals. Real-world applications of such sidelink communications may include public safety, proximity services, UE-to-network relaying, vehicle-to-vehicle (V2V) communications, Internet of Everything (IoE) communications, IoT communications, mission-critical mesh, and/or various other suitable applications. Generally, a sidelink signal may refer to a signal communicated from one subordinate entity (e.g., UE1) to another subordinate entity (e.g., UE2) without relaying that communication through the scheduling entity (e.g., UE or BS), even though the scheduling entity may be utilized for scheduling and/or control purposes. In some examples, the sidelink signals may be communicated using a licensed spectrum (unlike wireless local area networks, which typically use an unlicensed spectrum).

A UE may operate in various radio resource configurations, including a configuration associated with transmitting pilots using a dedicated set of resources (e.g., a radio resource control (RRC) dedicated state, etc.) or a configuration associated with transmitting pilots using a common set of resources (e.g., an RRC common state, etc.). When operating in the RRC dedicated state, the UE may select a dedicated set of resources for transmitting a pilot signal to a network. When operating in the RRC common state, the UE may select a common set of resources for transmitting a pilot signal to the network. In either case, a pilot signal transmitted by the UE may be received by one or more network access devices, such as an, or a DU, or portions thereof. Each receiving network access device may be configured to receive and measure pilot signals transmitted on the common set of resources, and also receive and measure pilot signals transmitted on dedicated sets of resources allocated to the UEs for which the network access device is a member of a monitoring set of network access devices for the UE. One or more of the receiving network access devices, or a CU to which receiving network access device(s) transmit the measurements of the pilot signals, may use the measurements to identify serving cells for the UEs, or to initiate a change of serving cell for one or more of the UEs.

Example Channel State Information (CSI) Feedback

As channel conditions between a user equipment (UE) and a base station (BS) change, it is important for the UE to periodically or aperiodically report certain indications (e.g., channel quality indicator (CQI), precoding matrix index (PMI), and rank indicator (RI)) about the latest channel conditions to the BS. In certain aspects, the UE transmits a CSI report to the BS including one or more of these indications to indicate the channel conditions to the BS. The BS then utilizes the received CSI report to improve communications with the UE. In certain aspects, such as under the 3GPP standards for New Radio (NR) or the 5-th Generation (5G) cellular systems, CSI reporting with two types of spatial information feedback is supported. Type I CSI feedback is the CSI feedback scheme that is also used by wireless communications devices comporting to the LTE standards. Type I CSI feedback comprises codebook-based PMI feedback with normal spatial resolution. Type II CSI feedback is an enhanced feedback scheme, enabling explicit feedback and/or codebook-based feedback with higher spatial resolution.

Figure 7:
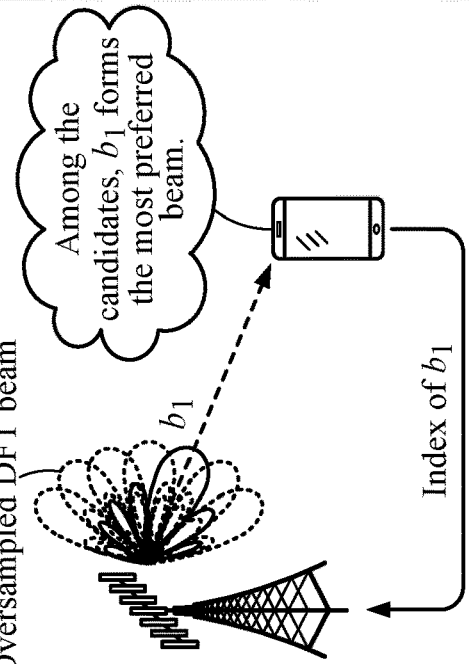
FIG. 7 shows a comparison between the Type 1 and Type 2 precoder feedback.

FIG. 7 shows a comparison between the Type 1 and Type 2 precoder feedback. As shown, a Type I CSI feedback corresponds to a lower resolution and smaller payload while Type II CSI corresponds to a higher resolution and larger payload. That is because Type II CSI feedback includes information of linear combination coefficients associated with different spatial beams identified in a codebook, which includes information comprising amplitude and phase of the coefficients, associated with different frequency subbands.

For Type II CSI feedback, at least one of Categories 1, 2, and/or 3 may be used. Category 1 relates to reporting a precoder feedback based on a linear combination of dual-stage codebooks. In certain aspects, a linear combination of the dual-stage codebooks supports up to 4 beam combinations with a certain precoder structure. For example, the PMI codebook may assume the following precoder structure:

For rank 1:

$$W = \begin{bmatrix} \tilde{w}_{0,0} \\ \tilde{w}_{1,0} \end{bmatrix} = W_1 W_2,$$

where W is normalized to 1. $W_1$ and $W_2$ indicate precoding weights for rank 1 (or transmission layer 1). For rank 2:

$$W = \begin{bmatrix} \tilde{w}_{0,0} & \tilde{w}_{0,1} \\ \tilde{w}_{1,0} & \tilde{w}_{1,1} \end{bmatrix} = W_1 W_2,$$

where columns of W are normalized to $$\frac{1}{\sqrt{2}}.$$

Based on such a precoder structure, the UE may feed the following information back to the BS: $\tilde{w}_{r,l} = \Sigma_{i=0}^{L-1} b_{k_1^{(i)} k_2^{(i)}} \cdot p_{r,l,i}^{(WB)} \cdot p_{r,l,i}^{(SB)} \cdot c_{r,l,i}$ (weighted combination of L beams). In this formula, r stands for polarization and l stands for transmission layer. In addition, up to L wideband orthogonal beams are selected. In addition, as shown, the UE reports the wideband amplitude as well as the subband differential amplitude. Also, a number of bits (e.g., 2 or 3 bits) are used to report the subband phase with amplitude dependent quantization.

As shown in FIG. 7, Type II CSI feedback allows a UE to report multiple DFT beam basis (e.g., $b_1$ and $b_2$) along with a quantized coefficient set (e.g., $c_1$ and $c_2$) used to linearly combine the multiple beams to form a virtual beam. In an aspect, if multiple frequency subbands are configured, the selection of beams is wideband, and thus each subband uses the same subset of beams in the spatial domain. The coefficient feedback however is subband specific.

In certain aspects, because Type II CSI reporting provides a higher resolution (more granular channel information over a number of subbands, transmission layers, and/or beams etc.), the overhead associated with Type II CSI reporting is large even if the reporting is performed for only two transmission layers (e.g., up to rank 2). For example, since the number of subbands configured may be large, the overall CSI overhead for 3GPP's Rel.15 type-II CSI may also be large. For example, the total PMI bits may be more than, for example, 900 bits in worst case for 3GPP's Rel.15 type-II CSI. Also, trivial extension to a higher rank may result in even larger payload bits. In addition, payload (or overhead) increases linearly as the number of beams and/or ranks increases.

In certain aspects, in order to reduce the Type II CSI feedback overhead, 3GPP's Rel-16 proposes compression of the subband coefficient set of Rel-15 by transferring the subband coefficients defined in Rel-15 into another domain (e.g., DFT basis domain or DCT domain), and selecting only the dominant coefficients associated with each beam in the transferred domain for feedback. In this way the overall number of coefficients reported to the UE may be reduced as compared to Rel. 15, thus reducing CSI overhead.

FIG. 8 illustrates an example compression of the Rel. 15 Type II CSI feedback as being proposed for Rel. 16, in accordance with certain aspects of the present disclosure.

'W' represents the precoding matrix to be fed back by a UE, W having a size of "$N_{tx} \times N_{sb}$", where $N_{tx}$ is the number of transmit antennas and $N_{sb}$ is the number of configured subbands. As shown, according to Rel.15 Type II CSI feedback, W may be based on a spatial domain compression matrix B having a size of "$N_{tx} \times 2L$" and a subband coefficient matrix having a size of "$2L \times N_{sb}$" to be fed back by the UE as part of the Rel. 15 Type II CSI feedback, wherein 2L represents a number of beams identified for the CSI feedback (e.g., from Type-II codebook). In an aspect, as may be deduced from the C matrix, if the number of configured subbands $N_{sb}$ is large, the feedback overhead (e.g, number of bits) to feedback all coefficients from the C matrix is also large.

In certain aspects, for Rel. 16 enhanced CSI feedback, the subband coefficient set of Rel. 15 may be compressed by transferring the subband coefficients into a different domain (e.g., DFT basis domain) and selecting only the dominant transfer domain coefficients associated with each beam for the feedback. For example, as shown in FIG. 8, the subband coefficient matrix C may be transferred into DFT basis domain to obtain a transfer domain compression matrix V having a size of "$2L \times M$", wherein M represents an overall number of transfer domain bases (e.g., the number of columns in the matrix V) available for each beam identified for feedback (e.g., represented by a row of the matrix V, each row representing a different beam), the number of rows of the matrix V representing a number of beams identified for feedback.

The matrix F represents a frequency domain compression matrix (e.g., DFT matrix) having a size of "$M \times N_{sb}$". In an aspect, the matrix F includes the DFT basis with each row representing a DFT basis, wherein each DFT basis is orthogonal to other DFT basis. In an aspect, if $M=N_{sb}$, the F matrix is a full rank DFT basis matrix. In an aspect, the matrix F may be pre-configured or pre-selected and known to the UE and the base station.

In certain aspects, the coefficient compression matrix V is a time domain representation of the matrix C, wherein channel taps in the time domain are represented by coefficients in the matrix V. In an aspect, channel tap selection may be performed including selecting, for each beam, active (e.g., dominant or higher power) taps from a number of taps in the time-domain representation, wherein each active (e.g., dominant or higher power) tap for a particular beam is represented by a non-zero coefficient in a row representing the particular beam in the matrix V. In an aspect, the number of non-zero coefficients corresponding to active (e.g., dominant or higher power) channel taps may be sparse in the matrix V, and thus, reporting only those non-zero coefficients from the matrix V may reduce the coefficient set fed back by the UE. This, may significantly reduce the CSI overhead as compared to reporting all coefficients from matrix C in Rel. 15, while still capturing the essence of matrix C using the limited number of non-zero coefficients from matrix V.

In certain aspects, for each active tap, the amplitude and the phase of the active tap is quantized. For example, the amplitude and the phase may be quantized with 3 bits, or 2 bits for either amplitude or phase. In certain aspects, the level of quantization may be configurable.

Example Configurations and Feedback Schemes for Compressed Channel State Information (CSI)

In 3GPP's Rel. 16, it has been proposed that a constraint on the overall number of coefficients in the transferred domain (e.g., DFT basis domain), represented by $M_{total}$ (represented by the total number of non-zero coefficients in the coefficient compression matrix V shown in FIG. 8), associated with all spatial beams identified for feedback, may be configured for a UE (e.g., by the network) as a parameter known to both the UE and the network. Thus, this configuration becomes an initial constraint for the UE to select the non-zero coefficients to feedback in the transferred domain. In an aspect, such a constraint allows the UE to select different numbers of coefficients associated with different spatial beams. In other words, the UE, based on the constraint on the total number of coefficients to be reported, may decide to have different numbers of non-zero entries for different rows of the coefficient compression matrix V. This makes the compression of the Rel. 15 coefficient set more flexible at the UE end.

However, the detailed configurations and related feedback schemes for reporting the transfer domain coefficients (e.g., from the coefficient compression matrix V) have not been proposed in Rel. 16, when the overall number of transfer domain coefficients ($M_{total}$) to feedback in the transferred domain (e.g., DFT domain) is configured for the UE by the network.

Certain aspects of the present disclosure discuss several configurations and related feedback schemes for a UE to report transfer domain coefficients from a coefficient compression matrix (e.g., matrix V of FIG. 8) as part of CSI feedback, when the overall number of transfer domain coefficients ($M_{total}$) to feedback in the transferred domain is a configured parameter.

Figure 9:
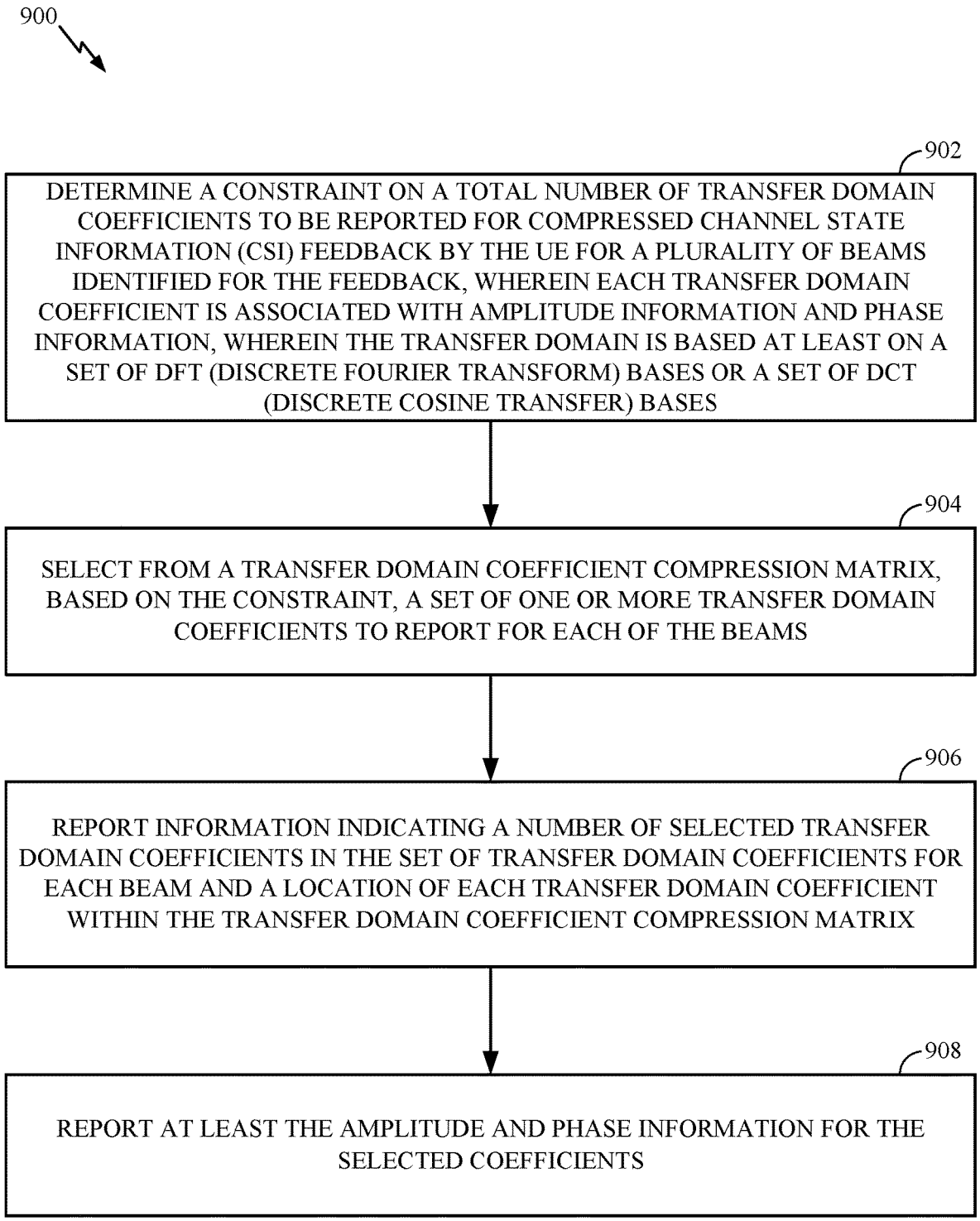
FIG. 9 illustrates example operations performed by a UE for reporting transfer domain coefficients for compressed CSI feedback in a transferred domain, in accordance with certain aspects of the present disclosure.

FIG. 9 illustrates example operations 900 performed by a UE for reporting transfer domain coefficients for compressed CSI feedback in a transferred domain, in accordance with certain aspects of the present disclosure.

Operations 900 begin, at 902, by the UE determining a constraint on a total number of transfer domain coefficients (e.g., $M_{total}$) to be reported for compressed CSI feedback by the UE for a plurality of beams identified for the feedback (e.g., represented by B), wherein each transfer domain coefficient is associated with amplitude information and phase information, wherein the transfer domain is based at least on a set of DFT (Discrete Fourier Transform) bases or a set of DCT (Discrete Cosine Transfer) bases.

At 904, the UE selects from a transfer domain coefficient compression matrix (e.g. matrix V of FIG. 8), based on the constraint, a set of one or more transfer domain coefficients to report for each of the beams.

At 906, the UE reports information indicating a number of selected transfer domain coefficients in the set of transfer domain coefficients for each beam and a location of each transfer domain coefficient within the transfer domain coefficient compression matrix.

At 908, the UE reports the amplitude and phase information for the selected coefficients.

Figure 10:
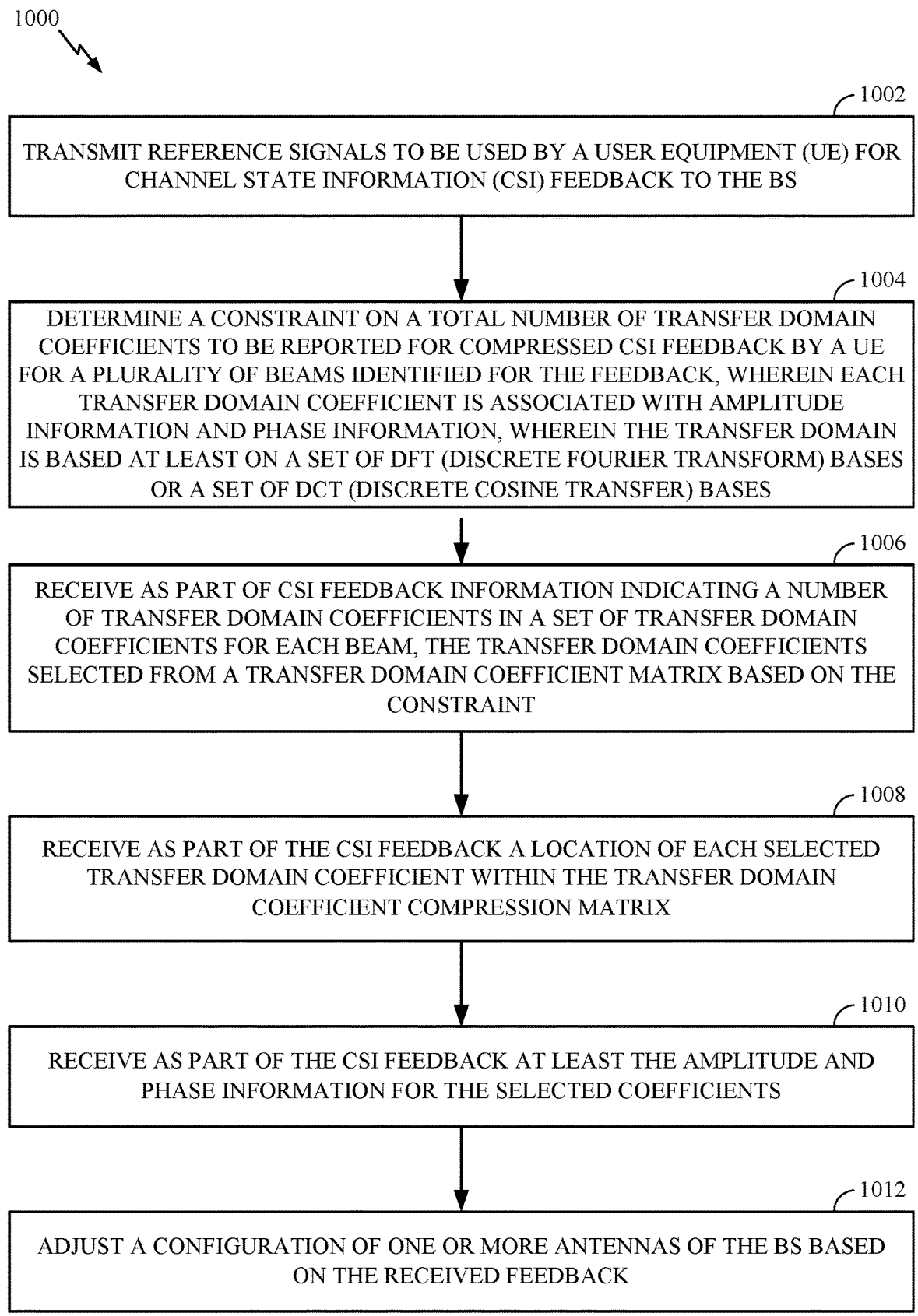
FIG. 10 illustrates example operations performed by a Base Station (BS) for reporting of transfer domain coefficients for compressed CSI feedback in a transferred domain, in accordance with certain aspects of the present disclosure.

FIG. 10 illustrates example operations 1000 performed by a Base Station (BS) for reporting of transfer domain coefficients for compressed CSI feedback in a transferred domain, in accordance with certain aspects of the present disclosure.

Operations 1000 begin, at 1002, by transmitting reference signals to be used by a UE for CSI feedback to the BS.

At 1004, the BS determines a constraint on a total number of transfer domain coefficients to be reported for compressed CSI feedback by a UE for a plurality of beams identified for the feedback, wherein each transfer domain coefficient is associated with amplitude information and phase information, wherein the transfer domain is based at least on a set of DFT (Discrete Fourier Transform) bases or a set of DCT (Discrete Cosine Transfer) bases.

At 1006, the BS receives as part of CSI feedback, information indicating a number of transfer domain coefficients in a set of transfer domain coefficients for each beam, the transfer domain coefficients selected from a transfer domain coefficient matrix based on the constraint.

At 1008, the BS receives as part of the CSI feedback, a location of each selected transfer domain coefficient within the transfer domain coefficient compression matrix.

At 1010, the BS receives as part of the CSI feedback, at least the amplitude and phase information for the selected coefficients.

At 1012, the BS adjusts a configuration of one or more antennas of the BS based on the received feedback.

In certain aspects, certain assumptions are applicable for all feedback schemes discussed herein. For example, for all feedback schemes discussed herein, it is assumed that total number of transfer domain coefficients ($M_{total}$) to be reported by the UE is pre-configured. In an aspect, feedback for each coefficient includes A bits of amplitude and P bits of phase feedback. The overall number of beams identified for feedback (e.g., from Type-II codebook) is denoted by B=2L, where the number 2 is due to consideration of antenna polarization. For the bth beam of the B identified beams, a number of transfer domain coefficients associated with the bth beam is denoted by $M_b$, such that $M_{total}=\Sigma_{b=1}^{B}M_b$. In an aspect, M×$N_{sb}$ DFT basis matrix F may be pre-configured.

In an aspect, one or more of these parameters may be configured, for example, via RRC signaling or as DCI.

Feedback Scheme 1

This feedback scheme may be used when there is no configured constraint on the number of coefficients to feedback for each beam.

In certain aspects, if the overall number of transfer domain coefficients available for each identified beam (e.g., the number of columns in transfer domain coefficient compression matrix V, or the number of rows in matrix F) is represented by M, then the number of coefficients reported for each identified beam $M_b \leq M$. In this context, for each identified beam, the UE may use an M-bit bit-map to indicate the number and locations of the selected coefficients for each identified beam. In an aspect, each bit in the M-bit bit-map for a beam indicates whether a corresponding coefficient, of the M coefficients available for the beam, is included in the set of selected coefficients to be reported for the beam. The UE may use (B×M) bits to feedback the numbers and locations of coefficients for all identified beams, wherein as noted above, B is the total number of beams identified for the CSI feedback. In other words, the UE may use (B×M) bits to feedback the numbers and locations of non-zero coefficients for every row in the coefficient compression matrix V.

In certain aspects, the UE may also report amplitude and phase information associated with each coefficient selected for feedback. In certain aspects, for each selected transfer domain coefficient, a number of bits used for reporting the amplitude and phase information for each selected transfer domain coefficient may be based at least on a predefined number of bits used to quantize amplitude and phase of the transfer domain coefficient. Further, the UE may sort amplitude values and phase values for the CSI feedback in an order based at least on beam indices of the identified beams and further in an order based at least on coefficient indices of the transfer domain coefficients for each beam. For example, the UE may feedback each selected coefficients in an ascending order first according to the coefficient's beam index (i.e., the row index in matrix V) and secondly according to the coefficient's index within the beam (i.e., the column index in matrix V). Assuming that the UE uses A bits for an amplitude value and P bits for a phase value, the overall number of bits used to report amplitude and phase feedback for all selected coefficients for all beams may be $M_{total}(A+P)$.

Thus, the overall number of bits the UE may use to feedback the numbers, locations, amplitudes, and phases of all selected coefficients is $BM+M_{total}(A+P)$.

It may be noted that, feedback scheme 1 may be used to report the transfer domain coefficients even if there are constraints regarding a maximum and/or minimum number of coefficients selected to be reported for each beam.

Feedback Scheme 2

This feedback scheme may be used when there is a configured constraint regarding a maximum number of coefficients to be reported for each beam. In an aspect, the constraint on the maximum number of coefficients to feedback for each beam may be represented by $\overline{M}$. For most scenarios $\overline{M}<M$. In certain aspects, the UE may receive a value of $\overline{M}$ from the network, for example via RRC signaling or as part of DCI. In some scenarios, $\overline{M}=M$.

In some scenarios, if the value of $\overline{M}$ is very small, to reduce the overhead, the UE may explicitly feedback the numbers and indices of the selected coefficients, instead of using the bitmaps as in Feedback Scheme 1. For example, the UE reports an index of each selected transfer domain coefficient, instead of using a bit-map to indicate the location of the transfer domain coefficient.

For feedback scheme 2, the UE may use $\lceil \log_2(\overline{M}+1) \rceil$ bits to feedback the number of coefficients selected to feedback in the bth beam (i.e., $M_b$). Thus, the overall number of bits used to feedback the number of selected coefficients for all beams may be determined as $B\lceil \log_2(\overline{M}+1) \rceil$.

In an aspect, for each beam, the UE may use $\lceil \log_2 M \rceil$ bits to feedback each selected coefficient's index (i.e., the column index in matrix V). The indices of the selected coefficients for all beams may be ordered (e.g., ascendingly ordered), for example, firstly according to the beam indices (i.e., the row indices in matrix V) and secondly according to the coefficient indices of coefficients within each beam (i.e., the column index in matrix V). Thus the overall number of bits the UE uses to feedback the coefficient indexes may be determined as $\Sigma_{b=1}^{B}(M_b \lceil \log_2 M \rceil)$.

Further, the UE may feedback amplitude and phase information for each selected coefficient, in an order (e.g., ascending order) firstly according to the coefficient's beam index (i.e., the row index in matrix V) and secondly according to the coefficient's index within the beam (i.e., the column index in matrix V). Assuming the UE uses A bits for the amplitude and P bits for the phase associated with each coefficient, the overall number of bits the UE uses for amplitude and phase feedback for all beams may be determined as $\Sigma_{b=1}^{B}(M_b(A+P))$.

Thus, the overall number of bits to feedback the numbers, locations (e.g., indices), amplitudes, and phase information of all the selected coefficients for all beams may be determined as $B\lceil \log_2(\overline{M}+1) \rceil + \Sigma_{b=1}^{B}(M_b \lceil \log_2 M \rceil) + \Sigma_{b=1}^{B}(M_b(A+P))$.

It may be noted that, even if the constraint $\overline{M}$ is not configured, Feedback Scheme 2 may still be used to feedback the coefficients' locations and values, by substituting $\overline{M}$ with M in in Feedback Scheme 2. However, it may be noted that this may lead to more overhead compared to using Feedback Scheme 1 under the same condition.

Feedback Scheme 3

This feedback scheme may be used when there is a configured constraint $\overline{M}$ regarding a maximum number of coefficients to be reported for each beam, as well as a constraint on the minimum number of coefficients to be reported for each beam. In an aspect, the constraint on the minimum number of coefficients to feedback for each beam may be represented by $\underline{M}$. For most scenarios, $\overline{M}<M$ and $\underline{M}<\overline{M}$. In certain aspects, the UE may receive values of $\overline{M}$ and $\underline{M}$ from the network, for example via RRC signaling or as part of DCI. In some scenarios, $\overline{M}=M$. Further, in some scenarios, $\underline{M}=0$.

In some scenarios, if the value of $\overline{M}-\underline{M}$ is very small, to reduce the overhead, the UE may explicitly feedback the numbers and indices of the selected coefficients, instead of using the bitmaps as in Feedback Scheme 1. For example, the UE reports an index of each selected transfer domain coefficient, instead of using a bit-map to indicate the location of the transfer domain coefficient.

For feedback scheme 3, the UE may use $\lceil \log_2(\overline{M}-\underline{M}+1) \rceil$ bits to feedback the number of coefficients selected to feedback in the bth beam (i.e., $M_b$). Thus, the overall number of bits used to feedback the number of selected coefficients for all beams may be determined as $B\lceil \log_2(\overline{M}-\underline{M}+1) \rceil$.

In an aspect, for each beam, the UE may use $\lceil \log_2 M \rceil$ bits to feedback each selected coefficient's index (i.e., the column index in matrix V). The indices of the selected coefficients for all beams may be ordered (e.g., ascendingly ordered), for example, firstly according to the beam indices (i.e., the row indices in matrix V) and secondly according to the coefficient indices of coefficients within each beam (i.e., the column index in matrix V). Thus the overall number of bits the UE uses to feedback the coefficient indexes may be determined as $\Sigma_{b=1}^{B}(M_b \lceil \log_2 M \rceil)$.

Further, the UE may feedback amplitude and phase information for each selected coefficient, in an order (e.g., ascending order) firstly according to the coefficient's beam index (i.e., the row index in matrix V) and secondly according to the coefficient's index within the beam (i.e., the column index in matrix V). Assuming the UE uses A bits for the amplitude and P bits for the phase associated with each coefficient, the overall number of bits the UE uses for amplitude and phase feedback for all beams may be determined as $\Sigma_{b=1}^{B}(M_b(A+P))$.

Thus, the overall number of bits to feedback the numbers, locations (e.g., indices), amplitudes, and phase information of all the selected coefficients for all beams may be determined as $B\lceil \log_2(\overline{M}-\underline{M}+1) \rceil + \Sigma_{b=1}^{B}(M_b \lceil \log_2 M \rceil) + \Sigma_{b=1}^{B}(M_b(A+P))$.

It may be noted that, even if the constraints $\overline{M}$ and $\underline{M}$ are not configured, Feedback Scheme 3 may still be used to feedback the coefficients' locations and values, by substituting $\overline{M}-\underline{M}$ with M in in Feedback Scheme 3. However, it may be noted that this may lead to more overhead compared to using Feedback Scheme 1 under the same condition.

Feedback Scheme 4

This feedback scheme may be used to report differential amplitude and phase feedback associated with the transfer domain coefficients. The numbers and locations of the coefficients may be reported according to any of the Feedback Schemes 1, 2 or 3, or a combination there of. In certain aspects, the Feedback Scheme 4 discussed herein may be used with any one of Feedback Schemes 1, 2, or 3, to report the differential amplitude and feedback associated with the transfer domain coefficients for those feedback schemes.

In certain aspects, the reported amplitude and phase information as part of CSI feedback may include beam-specific amplitude and phase values and coefficient-specific differential amplitude and phase values. In an aspect, the coefficient-specific differential amplitude and phase values for each selected transfer domain coefficient is based at least on the beam-specific amplitude and phase values respectively of the beam associated with the coefficient.

In certain aspects, a number of bits used by the UE for reporting amplitude and phase information comprises a number of bits for reporting the beam-specific amplitude and phase values, and a number of bits for reporting the coefficient-specific differential amplitude values and differential phase values.

In certain aspects, a number of bits used for reporting the beam-specific amplitude and phase values for each selected transfer domain coefficient is based at least on a predefined number of bits to quantize beam-specific amplitude and phase of each identified beam. Further, a number of bits used for reporting the coefficient-specific differential amplitude and phase values for each selected transfer domain coefficient is based at least on a predefined number of bits to quantize coefficient-specific differential amplitude and phase values of each transfer domain coefficient.

In certain aspects, the number of bits used for reporting the beam-specific amplitude information for each identified beam may be represented as $A_1$, and the number of bits used for reporting the beam-specific phase information for each identified beam may be represented as $P_1$. Further, the number of bits used for reporting the coefficient-specific differential amplitude information for each selected transfer domain coefficient may be represented as $A_2$ and the number of bits used for reporting the coefficient-specific differential phase information for each selected transfer domain coefficient may be represented as $P_2$.

In certain aspects, when reporting the amplitude and phase of the non-zero coefficients for a certain beam, a beam-specific amplitude value using $A_1$ bits and a beam-specific phase value using $P_1$ bits are firstly reported. Then for the specific non-zero coefficient to feedback, a coefficient-specific differential amplitude value based on the beam-specific amplitude value using $A_2$ bits and a coefficient-specific differential phase value based on the beam-specific phase value using $P_2$ bits are additionally reported.

In certain aspects, a number of bits used for reporting the beam-specific amplitude and phase values for the selected transfer domain coefficients for all identified beams may be determined as $B(A_1+P_1)$. Further, a number of bits used for reporting the coefficient-specific differential amplitude and phase values for the selected transfer domain coefficients for all beams may be determined as $M_{total}(A_2+P_2)$.

For Feedback Schemes 1, 2, and 3, the amplitude and phase feedback using this differential reporting method may be carried out, by initially sorting the beam-specific amplitude and phase values according to the ascending order of beam index (i.e., the row index in matrix V), then sorting the coefficient-specific values according to the ascending order of firstly the coefficient's beam index (i.e., the row index in matrix V) and secondly the coefficient's index within the beam (i.e., the column index in matrix V).

In certain aspects, the number of bits used for reporting the beam-specific amplitude and phase values for all beams and the coefficient-specific differential amplitude values and the differential phase values of all selected transfer domain coefficients may be determined as $\Sigma_{b=1,M_b>0}^{B}((A_1+P_1)+M_b(A_2+P_2))$.

Thus, the total bit-overhead calculation using Feedback Scheme 4 in combination with each of Feedback Schemes 1, 2, and 3 may be determined as follows.

Feedback Scheme 4 with Feedback Scheme 1:

$BM+B(A_1+P_1)+\Sigma_{b=1,M_b>0}^{B}((A_1+P_1)+M_b(A_2+P_2))$.

Feedback Scheme 4 with Feedback Scheme 2:

$B\lceil\log_2(\overline{M}+1)\rceil+\Sigma_{b=1}^{B}(M_b\lceil\log_2 M\rceil)+\Sigma_{b=1,M_b>0}^{B}((A_1+P_1)+M_b(A_2+P_2))$.

Feedback Scheme 4 with Feedback Scheme 3:

$B\lceil\log_2(\overline{M}-\overline{M}+1)\rceil+\Sigma_{b=1}^{B}(M_b\lceil\log_2 M\rceil)+\Sigma_{b=1,M_b>0}^{B}((A_1+P_1)+M_b(A_2+P_2))$.

Feedback Scheme 5

This feedback scheme may be used to implicitly indicate locations of selected coefficients.

In certain aspects, if the number of coefficients selected for reporting is provided (e.g., configured) for each beam, instead of explicitly indicating the coefficient's index (i.e., the column index in matrix V) as in Feedback Schemes 2 and 3, the UE may alternatively use several combinatorial bits to implicitly feedback the locations of the coefficients for a beam.

In certain aspects, for each identified beam, the UE may use a bit-point, based at least on a look-up table, to indicate locations of the selected transfer domain coefficients within the coefficient compression matrix, associated with the identified beam. In an aspect, the look-up table identifies a plurality of bit-points that identify respective combinations of locations of the selected transfer domain coefficients within the coefficient compression matrix, associated with the identified beam. In an aspect, the number of bit-points identified in the look-up table is based at least on a number of combinations for selecting the selected number of transfer domain coefficients from the overall number of coefficients M available for each identified beam.

For example, for the bth beam, if the number of coefficients selected is $M_b$, and the overall number of available coefficients is M (i.e., the number of columns in matrix V), then there are in total $C_M^{M_b}$ number of combinations to choose $M_b$ elements out of the overall M elements for the bth beam. Therefore, the UE may use $\lceil\log_2 C_M^{M_b}\rceil$ bits to indicate the $C_M^{M_b}$ possible combinations for the bth beam, wherein each valid bit-point (e.g., combination of bits) indicates a specific combination of coefficient selection. In an aspect, if $M_b=0$ then 0 bits are used for the indication. The relation between a certain bit-point and a corresponding combination may be predefined (e.g., in a lookup table), or alternatively using a searching algorithm agreed between the NW and the UE. The overhead of such indication for B beams to indicate bit points for the B beams may therefore be determined as $\Sigma_{b=1,M_b>0}^{B}\lceil\log_2 C_M^{M_b}\rceil$ bits. In certain aspects, since the number of coefficients selected for each beam (i.e., $M_b$) is assumed to be already given, the number of bits for such indication and the corresponding definition of bit-points used for each beam (e.g., from the look up table) may be interpreted by the NW successfully to determine the locations of the selected coefficients for each beam within the matrix V.

In certain aspects, the Feedback Scheme 5 may be combined with Feedback Schemes 2 and 3. Further, Feedback Scheme 4 may or may not be used to report the differential amplitude and phase values.

The numbers of bits using Feedback Scheme 5 in combination with Feedback Schemes 2 and 3 (with and without using Feedback Scheme 4) is determined as follows:

Feedback Scheme-2 (without Scheme-4):

$B\lceil\log_2(\overline{M}+1)\rceil+\Sigma_{b=1,M_b>0}^{B}\lceil\log_2 C_M^{M_b}\rceil+\Sigma_{b=1}^{B}(M_b(A+P))$.

Feedback Scheme-2 (with Scheme-4):

$B\lceil\log_2(\overline{M}+1)\rceil+\Sigma_{b=1,M_b>0}^{B}\lceil\log_2 C_M^{M_b}\rceil+\Sigma_{b=1,M_b>0}^{B}((A_1+P_1)+M_b(A_2+P_2))$.

Feedback Scheme-3 (without Scheme-4):

$B\lceil\log_2(\overline{M}-\overline{M}+1)\rceil+\Sigma_{b=1,M_b>0}^{B}\lceil\log_2 C_M^{M_b}\rceil+\Sigma_{b=1}^{B}(M_b(A+P))$.

Feedback Scheme-3 (with Scheme-4):

$B\lceil\log_2(\overline{M}-\overline{M}+1)\rceil+\Sigma_{b=1,M_b>0}^{B}\lceil\log_2 C_M^{M_b}\rceil+\Sigma_{b=1,M_b>0}^{B}((A_1+P_1)+M_b(A_2+P_2))$ It may be expected that the bit overhead by using Feedback Scheme-5 may be reduced as compared to using Schemes-2 and 3 and their implementations using Scheme-4. However, in an aspect, the searching of a bit-point to match a specific combination may increase the UE's processing complexity.

Feedback Scheme 5b

Feedback scheme 5b may be an extension of feedback scheme 5. In feedback scheme 5 each bit point indicates a particular combination of selected coefficients for a bth beam. That is, in scheme 5, the feedback of the selected coefficients' number and location is carried out for each beam separately.

Additionally or alternatively, for Scheme 5b, the UE may determine combinations of selected coefficients over all identified beams, such that each bit point indicates a specification of coefficients selected over all the beams in the matrix V. The total number of bit points may be equal to the total number of combinations to select $M_{total}$ coefficients from BM available coefficients in matrix V.

Thus, in certain aspects, for all identified beams, the UE may use bit-points (e.g., combination of bits), based at least on a look-up table, to indicate locations of the set of selected transfer domain coefficients within the coefficient compression matrix, wherein the look-up table identifies a plurality of bit-points that identify respective combinations of locations of the selected transfer domain coefficients within the coefficient compression matrix, associated with all identified beams.

In certain aspects, if the values of $\{M_1, M_2, \ldots, M_B\}$ are configured or predefined in standards, given the constraint on the overall number of coefficients (i.e., the value of $M_{total}$) and the rank of the DFT basis (i.e., the value of M), a total number of $\lceil \Sigma_{b=1}^{B} \log_2 C_M^{M_b} \rceil$ bits may be used to represent all combinations of the coefficients' choices in matrix V, wherein $C_M^{M_b}$ represents the number of cases for choosing $M_b$ elements out of the total M elements.

In this context, the constraints on the maximum and minimum number of coefficients that may be selected for each beam have no impact on the overall overhead. Thus, the overhead calculation for using Feedback scheme 5b with schemes 2 or 3 is the same.

The overall overheads in terms of number of bits for different cases may be determined as follows.

With out Method-4: $\lceil \Sigma_{b=1}^{B} \log_2 C_M^{M_b} \rceil + \Sigma_{b=1}^{B}(M_b(A+P))$.

With Method-4: $\lceil \Sigma_{b=1}^{B} \log_2 C_M^{M_b} \rceil + \Sigma_{b=1, M_b>0}^{B}((A_1+P_1)+M_b(A_2+P_2))$.

Alternatively, a total number of $\lceil \log_2 C_{BM}^{M_{total}} \rceil$ bits are needed to represent all combinations of the coefficient choices for all beams. The overall overheads in terms of number of bits for different cases may be determined as follows.

With out Method-4: $\lceil \log_2 C_{BM}^{M_{total}} \rceil + \Sigma_{b=1}^{B}(M_b(A+P))$.

With Method-4: $\lceil \log_2 C_{BM}^{M_{total}} \rceil + \Sigma_{b=1, M_b>0}^{B}((A_1+P_1)+M_b(A_2+P_2))$.

Following are examples of overhead calculations using Rel.15 as well as based on using each of the above discussed feedback schemes. The examples show overhead comparison with Rel.15 and between the schemes based on different configurations.

Example-1

$N_{sb}=19$, full-rank DFT basis
The following parameters are defined for this example:
The overall number of subbands is $N_{sb}=19$.
For each coefficient, the number of bits used for amplitude feedback is A=3, and the number of bits used for phase feedback is P=2.
For differential feedback, we have $A_1=2$, $P_1=1$, $A_2=1$, and $P_2=1$.
The DFT matrix in the transferred domain is full such that $M=N_{sb}=19$. The number of non-zero coefficients selected in each beam is shown in Table-1 below.
The constraint on the overall number of coefficients in the transferred domain to feedback is $M_{total}=21$.

TABLE 1

| $M_1$ | $M_2$ | $M_3$ | $M_4$ | $M_5$ | $M_6$ | $M_7$ | $M_8$ |
|---|---|---|---|---|---|---|---|
| 3 | 3 | 2 | 3 | 2 | 3 | 3 | 2 |

Following are overhead calculations based on the above parameters.
Rel.15 Type-2
Since L=4, for 2L beams, the overall number of coefficients for 19 subbands is 19×2L=152.
Thus the overall number of bits to feedback all coefficients' amplitude and phase is 152×(3+2)=760 bits.
Scheme-1.
The overall number of bits for the feedback is $BM+M_{total}(A+P)=8\times19+21\times5=257$ bits.
Scheme-2
The constraint in each subband is $\overline{M}=3$.
The overall number of bits for the feedback is $B\lceil\log_2 \overline{M}\rceil+\Sigma_{b=1}^{B}(M_b\lceil\log_2 M\rceil)+\Sigma_{b=1}^{B}(M_b(A+P))=8\times2+5\times21+5\times21=226$ bits.
Scheme-3
The constraint is $\overline{M}=3$ and $\underline{M}=2$.
The overall number of bits for the feedback is $B\lceil\log_2(\overline{M}-\underline{M})\rceil+\Sigma_{b=1}^{B}(M_b\lceil\log_2 M\rceil)+\Sigma_{b=1}^{B}(M_b(A+P))=8\times1+5\times21+5\times21=218$ bits.
Scheme-4 (Differential Feedback)
Type-2 uses 8×(2+1)+152×(1+1)=328 bits.
Scheme-1 uses 8×19+8×3+21×2=218 bits.
Scheme-2 uses 8×2+5×21+8×3+21×2=187 bits.
Scheme-3 uses 8×1+5×21+8×3+21×2=179 bits.
Scheme-5 (Implicit Location Feedback)
Scheme-2 (w/o Scheme-4) uses 8×2+8×3+10×5+5×21=195 bits.
Scheme-2 (w/ Scheme-4) uses 8×2+8×3+10×5+8×3+21×2=156 bits.
Scheme-3 (w/o Scheme-4) uses 8×1+8×3+10×5+5×21=187 bits.
Scheme-3 (w/ Scheme-4) uses 8×1+8×3+10×5+8×3+21×2=148 bits.
Scheme-5B (Overall Combination, & $M_b$ not Predefined)
(w/o Scheme-4) uses $\lceil\log_2 C_{8\times19}^{21}\rceil+5\times21=85+105=190$ bits.
(w/ Scheme-4) uses $\lceil\log_2 C_{8\times19}^{21}\rceil+8\times3+21\times2=151$ bits.

Example-2

Subband number=8, full-rank DFT basis
The following parameters are defined for this example.
The overall number of subbands is $N_{sb}=8$.
For each coefficient, the number of bits used for amplitude feedback is A=3, and the number of bits used for phase feedback is P=2.
The DFT matrix in the transferred domain is full such that M=8. The number of coefficients selected in each beam is shown in Table-2 below.
The overall number of coefficients in the transferred domain to feedback is $M_{total}=13$.

TABLE 2

| $M_1$ | $M_2$ | $M_3$ | $M_4$ | $M_5$ | $M_6$ | $M_7$ | $M_8$ |
|---|---|---|---|---|---|---|---|
| 2 | 2 | 1 | 2 | 1 | 2 | 2 | 1 |

Following are overhead calculations based on the above parameters.

Rel.15 Type-2

Since L=4, for 2L beams, the overall number of coefficients for 8 subbands is 8×2L=64.

Thus the overall number of bits to feedback all coefficients' amplitude and phase is 64×(3+2)=320.

Scheme-1

The overall number of bits for the feedback is $BM+M_{total}(A+P)=8\times8+13\times5=129$ bits.

Scheme-2

The constraint is $\overline{M}=3$.

The overall number of bits for the feedback is $B\lceil\log_2\overline{M}\rceil+\Sigma_{b=1}^{B}(M_b\lceil\log_2 M\rceil)+\Sigma_{b=1}^{B}(M_b(A+P))=8\times2+3\times13+5\times13=120$ bits.

Scheme-3

The constraint is $\overline{M}=2$ and $\overline{\overline{M}}=1$.

The overall number of bits for the feedback is $B+\Sigma_{b=1}^{B}(M_b\lceil\log_2 M\rceil)+\Sigma_{b=1}^{B}(M_b(A+P))=8+3\times13+5\times13=112$ bits.

Scheme-4 (Differential Feedback)

Type-2 uses 8×(2+1)+64×(1+1)=152 bits.

Scheme-1 uses 8×8+8×3+13×2=114 bits.

Scheme-2 uses 8×2+3×13+8×3+13×2=105 bits.

Scheme-3 uses 8×1+3×13+8×3+13×2=97 bits.

Scheme-5 (Implicit Location Feedback)

Scheme-2 (w/o Scheme-4) uses 8×2+3×3+5×5+5×13=115 bits.

Scheme-2 (w/ Scheme-4) uses 8×2+3×3+5×5+8×3+13×2=100 bits.

Scheme-3 (w/o Scheme-4) uses 8×1+3×3+5×5+5×13=115=117 bits.

Scheme-3 (w/ Scheme-4) uses 8×1+3×3+5×5+8×3+13×2=92 bits.

Scheme-5B (Overall Combination, & $M_b$ not Predefined)

(w/o Scheme-4) uses $\lceil\log_2 C_{8\times8}^{13}\rceil+5\times13=44+65=109$ bits.

(w/ Scheme-4) uses $\lceil\log_2 C_{8\times8}^{13}\rceil+81+8\times3+13\times2=94$ bits.

Example-3

Subband Number=19, non-full-rank DFT basis

The following parameters are defined for this example.

The overall number of subbands is $N_{sb}=19$.

For each coefficient, the number of bits used for amplitude feedback is A=3, and the number of bits used for phase feedback is P=2.

The DFT matrix in the transferred domain is not full-rank and M=8. The number of coefficients selected in each beam is shown in Table-3 below.

The overall number of coefficients in the transferred domain to feedback is $M_{total}=21$.

TABLE 3

| $M_1$ | $M_2$ | $M_3$ | $M_4$ | $M_5$ | $M_6$ | $M_7$ | $M_8$ |
|---|---|---|---|---|---|---|---|
| 3 | 3 | 2 | 3 | 2 | 3 | 3 | 2 |

Following are overhead calculations based on the above parameters.

Rel.15 Type-2

Since L=4, for 2L beams, the overall number of coefficients for 19 subbands is 19×2L=152.

Thus the overall number of bits to feedback all coefficients' amplitude and phase is 152×(3+2)=760 bits.

Scheme-1

The overall number of bits for the feedback is $BM+M_{total}(A+P)=8\times8+21\times5=169$ bits.

Scheme-2

The constraint in each subband is $\overline{M}=3$.

The overall number of bits for the feedback is $B\lceil\log_2\overline{M}\rceil+\Sigma_{b=1}^{B}(M_b\lceil\log_2 M\rceil)+\Sigma_{b=1}^{B}(M_b(A+P))=8\times2+3\times21+5\times21=184$ bits.

Scheme-3

The constraint is $\overline{M}=3$ and $\overline{\overline{M}}=2$.

The overall number of bits for the feedback is $B\lceil\log_2(\overline{M}-\overline{\overline{M}})\rceil+\Sigma_{b=1}(M_b\lceil\log_2 M\rceil)+\Sigma_{b=1}^{B}(M_b(A+P))=8\times1+3\times21+5\times21=176$ bits.

Scheme-4 (Differential Feedback)

Type-2 uses 8×(2+1)+152×(1+1)=328 bits.

Scheme-1 uses 8×8+8×3+21×2=130 bits.

Scheme-2 uses 8×2+3×21+8×3+21×2=145 bits.

Scheme-3 uses 8×1+3×21+8×3+21×2=137 bits.

Scheme-5 (Implicit Location Feedback)

Scheme-2 (w/o Scheme-4) uses 8×2+5×3+6×5+5×21=166 bits.

Scheme-2 (w/ Scheme-4) uses 8×2+5×3+6×5+8×3+21×2=127 bits.

Scheme-3 (w/o Scheme-4) uses 8×1+5×3+6×5+5×21=158 bits.

Scheme-3 (w/ Scheme-4) uses 8×1+5×3+6×5+8×3+21×2=119 bits.

Scheme-5B (Overall Combination, & $M_b$ not Predefined)

(w/o Scheme-4) uses $\lceil\log_2 C_{8\times8}^{21}\rceil+5\times21=56+105=161$ bits.

(w/ Scheme-4) uses $\lceil\log_2 C_{8\times8}^{21}\rceil+8\times3+21\times2=122$ bits.

Example-4

Subband number=8, non-full-rank DFT basis

The following parameters are defined for this example.

The overall number of subbands is $N_{sb}=8$.

For each coefficient, the number of bits used for amplitude feedback is A=3, and the number of bits used for phase feedback is P=2.

The DFT matrix in the transferred domain is not full-rank and M=3. The number of coefficients selected in each beam is shown in Table-4 below.

The overall number of coefficients in the transferred domain to feedback is $M_{total}=13$.

TABLE 4

| $M_1$ | $M_2$ | $M_3$ | $M_4$ | $M_5$ | $M_6$ | $M_7$ | $M_8$ |
|---|---|---|---|---|---|---|---|
| 2 | 2 | 1 | 2 | 1 | 2 | 2 | 1 |

Following are overhead calculations based on the above parameters.

Rel.15 Type-2

Since L=4, for 2L beams, the overall number of coefficients for 8 subbands is 8×2L=64.

Thus the overall number of bits to feedback all coefficients' amplitude and phase is 64×(3+2)=320.

Scheme-1

The overall number of bits for the feedback is $BM+M_{total}(A+P)=8\times3+13\times5=89$ bits.

Scheme-2

The constraint is $\overline{M}=3$.

The overall number of bits for the feedback is $B\lceil\log_2\overline{M}\rceil+\Sigma_{b=1}^{B}(M_b\lceil\log_2 M\rceil)+\Sigma_{b=1}^{B}(M_b(A+P))=8\times2+2\times13+5\times13=107$ bits.

Scheme-3

The constraint is $\overline{M}=2$ and $\overline{\overline{M}}=1$.

The overall number of bits for the feedback is $B+\Sigma_{b=1}^{B}(M_b\lceil\log_2 M\rceil)+\Sigma_{b=1}^{B}(M_b(A+P))=8+2\times13+5\times13=99$ bits.

Scheme-4 (Differential Feedback)
   Type-2 uses 8×(2+1)+64×(1+1)=152 bits.
   Scheme-1 uses 8×3+8×3+13×2=74 bits.
   Scheme-2 uses 8×2+2×13+8×3+13×2=92 bits.
   Scheme-3 uses 8×1+2×13+8×3+13×2=84 bits.
Scheme-5 (Implicit Location Feedback)
   Scheme-2 (w/o Scheme-4) uses 8×2+2×3+2×5+5×13=97 bits.
   Scheme-2 (w/ Scheme-4) uses 8×2+2×3+2×5+8×3+13×2=82 bits.
   Scheme-3 (w/o Scheme-4) uses 8×1+2×3+2×5+5×13=115=89 bits.
   Scheme-3 (w/ Scheme-4) uses 8×1+2×3+2×5+8×3+13×2=74 bits.
Scheme-5B (Overall Combination, & $M_b$ not Predefined)
   (w/o Scheme-4) uses $\lceil \log_2 C_{8\times3}^{13}\rceil$+5×13=22+65=87 bits.
   (w/ Scheme-4) uses $\lceil \log_2 C_{8\times3}^{13}\rceil$+8×3+13×2=72 bits.

The following observations may be made from the above examples:

In example-1 and example-2, when the DFT matrix in the transferred domain is a full-rank matrix, Scheme-2 and Scheme-3 have relatively lower overhead compared to Scheme-1.

However, in example-3 and example-4, when the DFT matrix in the transferred domain is not a full-rank matrix, Scheme-1 has lower overhead compared to Scheme-2 and Scheme-3.

As may be noted from the examples, using the differential coefficient value reporting in Scheme-4, overhead may be further reduced compared to the original schemes (e.g., schemes 1, 2 and 3) proposed in this disclosure.

Further, using the implicit coefficient location indication in Scheme-5, overhead may be even further reduced for Scheme-2 and Scheme-3, compared to the original schemes 2 and 3, and their implementations using Scheme-4. However, in some cases in Example-3 and Example-4, the reduced overhead may still be higher than Scheme-1 (or its implementation using Method-4).

Thus, the different feedback schemes discussed in aspects of the present disclosure may be more suitable to certain scenarios than others.

The methods disclosed herein comprise one or more steps or actions for achieving the methods. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112(f) unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations (e.g., operations described in FIGS. 9-10) described herein.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. A method for wireless communication by a User Equipment (UE), comprising:
   determining a constraint on a total number of transfer domain coefficients to be reported for compressed Channel State Information (CSI) feedback by the UE for a plurality of beams identified for the compressed CSI feedback, wherein each transfer domain coefficient is associated with amplitude information and phase information, and wherein a transfer domain for the transfer domain coefficients is based at least on a set of DFT (Discrete Fourier Transform) bases or a set of DCT (Discrete Cosine Transfer) bases;
   selecting from a transfer domain coefficient compression matrix, based on the constraint, a set of one or more transfer domain coefficients to report for each of the beams;
   reporting information indicating a number of selected transfer domain coefficients in the set of the one or more transfer domain coefficients for each beam and a location of each transfer domain coefficient within the transfer domain coefficient compression matrix; and
   reporting at least the amplitude and phase information for the selected transfer domain coefficients.

2. The method of claim 1, wherein the total number of the transfer domain coefficients to be reported is a fixed value.

3. The method of claim 1, wherein the transfer domain coefficient compression matrix is a coefficient matrix in the transfer domain,
wherein a number of rows of the transfer domain coefficient compression matrix represents a number of the plurality of the identified beams and a number of columns of the transfer domain coefficient compression matrix represents a number of the transfer domain coefficients available for each beam,
wherein each row corresponds to an identified beam and includes transfer domain coefficients associated with the identified beam,
wherein each element within a particular row represents a coefficient associated with an identified beam corresponding to the particular row, and
wherein the selecting the set of the one or more transfer domain coefficients to report for each of the beams includes selecting, from the transfer domain coefficient compression matrix, coefficients with non-zero values from the row corresponding to the identified beam.

4. The method of claim 1, wherein amplitude values and phase values for the compressed CSI feedback are sorted in an order based at least on beam indices of the identified beams and further in an order based at least on coefficient indices of the transfer domain coefficients for each beam.

5. The method of claim 1, wherein reporting the information indicating the number of the selected transfer domain coefficients and the location of each transfer domain coefficient comprises:
for each identified beam, applying a bit-map with a bit-width equal to an overall number of the transfer domain coefficients available for an identified beam, to indicate the number of the selected transfer domain coefficients and the locations of each transfer domain coefficient for the identified beam,
wherein each bit included in the bit-map indicates whether a corresponding coefficient, of the available transfer domain coefficients for the identified beam, is included in the set of the one or more transfer domain coefficients for the identified beam, and
wherein a number of bits for reporting bit-maps for all identified beams is based at least on a multiplication between a number of identified beams and a bit-width of each bit-map corresponding to each identified beam.

6. The method of claim 1, wherein a number of bits for reporting the amplitude and phase information for each selected transfer domain coefficient is based at least on a predefined number of bits to quantize amplitude and phase of a transfer domain coefficient, and
wherein a number of bits for reporting the amplitude and phase information for the selected transfer domain coefficients for all beams is based at least on the multiplication of a value of the constraint on the total number of transfer domain coefficients and the number of bits for reporting the amplitude and phase information for each selected transfer domain coefficient.

7. The method of claim 1, wherein the information relating to the location of each transfer domain coefficient is associated with an identified beam comprises an index of a transfer domain coefficient associated with the identified beam.

8. The method of claim 7, further comprising obtaining a maximum number of the transfer domain coefficients to feedback for each identified beam,
wherein obtaining the maximum number of the transfer domain coefficients to feedback for each identified beam comprises receiving the maximum number of the transfer domain coefficients via Radio Resource Control (RRC) signaling or Downlink Control Information (DCI), and
wherein the maximum number of the transfer domain coefficients to feedback for each identified beam is equal to a maximum number of available transfer domain coefficients for the identified beam.

9. The method of claim 8,
wherein a number of bits for indicating the number of the selected transfer domain coefficients associated with an identified beam is based at least on a ceiling of a logarithmic function, based by 2, of a value of the maximum number of the transfer domain coefficients to feedback for each identified beam, and
wherein a number of bits for indicating the number of the selected transfer domain coefficients for all identified beams is based at least on the multiplication between the number of bits for indicating the number of the selected transfer domain coefficients associated with each identified beam, and the number of identified beams.

10. The method of claim 7, further comprising:
for each identified beam, applying a plurality of sets of bits to explicitly indicate indices of the selected transfer domain coefficients associated with the identified beam, wherein each set of bits indicates a respective index of a selected transfer domain coefficient associated with the identified beam.

11. The method of claim 10, wherein a number of bits within a set of bits for indicating a particular selected transfer domain coefficient is based at least on, a ceiling of a logarithmic function, based by 2, of an overall number of transfer domain coefficients available for each identified beam,
wherein a number of bits for the plurality of sets of bits to indicate the indices of the selected transfer domain coefficients associated with the identified beam is based at least on a multiplication between a number of selected transfer domain coefficients associated with the identified beam, and the number of bits within a set of bits, and
wherein a number of bits for indicating indices of the selected transfer domain coefficients for all identified beams is based on a summation of the number of bits for indicating the selected transfer domain coefficients for each identified beam.

12. The method of claim 7, further comprising obtaining a maximum number of the transfer domain coefficients to feedback for each identified beam and a minimum number of the transfer domain coefficients to feedback for each identified beam.

13. The method of claim 12, wherein obtaining the maximum number of the transfer domain coefficients to feedback for each identified beam and the minimum number of the transfer domain coefficients to feedback for each identified beam comprises receiving the maximum number of the transfer domain coefficients and the minimum number of the transfer domain coefficients via Radio Resource Control (RRC) signaling or Downlink Control Information (DCI).

14. The method of claim 12, wherein the maximum number of the transfer domain coefficients to feedback for each identified beam is equal to the maximum number of available transfer domain coefficients for the identified beam, and wherein the minimum number of the transfer domain coefficients to feedback for each identified beam is equal to zero.

15. The method of claim 12, wherein a maximum number of the selected transfer domain coefficients to be reported for an identified beam is based at least on a difference between a value of the maximum number of the transfer domain coefficients to feedback for each identified beam and a value of the minimum number of the transfer domain coefficients to feedback for each identified beam.

16. The method of claim 15, wherein a number of bits for indicating the maximum number of the selected transfer domain coefficients associated with the identified beam is based at least on, a ceiling of a logarithmic function, based by 2, of the value of the maximum number of the selected transfer domain coefficients to be reported for the identified beam, and
wherein a number of bits for indicating the maximum number of the selected transfer domain coefficients for all identified beams is based at least on a multiplication between a number of identified beams and the number of bits for indicating the number of the selected transfer domain coefficients associated with each identified beam.

17. The method of claim 1, wherein the reported amplitude and phase information comprise beam-specific amplitude values and phase values and coefficient-specific differential amplitude values and differential phase values,
wherein a number of bits for reporting the amplitude and phase information comprises a number of bits for reporting the beam-specific amplitude values and the phase values, and a number of bits for reporting the coefficient-specific differential amplitude values and the differential phase values.

18. The method of claim 17, wherein the number of bits for reporting the beam-specific amplitude values and the phase values for each selected transfer domain coefficient is based at least on a predefined number of bits to quantize beam-specific amplitude and phase of each identified beam.

19. The method of claim 18, wherein the number of bits for reporting the beam-specific amplitude values and the phase values for the selected transfer domain coefficients for all identified beams is based at least on a multiplication of the total number of the plurality of identified beams and the number of bits for reporting the beam-specific amplitude values and the phase values for each selected transfer domain coefficient.

20. The method of claim 18, wherein for each selected transfer domain coefficient associated with an identified beam, the coefficient-specific differential amplitude values and the phase values for the selected transfer domain coefficient are based at least on the beam-specific amplitude values and the phase values respectively associated with the identified beam.

21. The method of claim 20, wherein the number of bits for reporting the coefficient-specific differential amplitude values and the phase values for each selected transfer domain coefficient is based at least on a predefined number of bits to quantize the coefficient-specific differential amplitude values and the phase values of each transfer domain coefficient, and
wherein the number of bits for reporting the coefficient-specific differential amplitude values and the phase values for the selected transfer domain coefficients for all beams is based at least on a multiplication of the total number of the selected transfer domain coefficients for reporting and the number of bits for reporting the coefficient-specific differential amplitude values and the phase values for each selected transfer domain coefficient.

22. The method of claim 1, further comprising:
for each identified beam, applying bit-points, based at least on a look-up table, to indicate locations of the selected transfer domain coefficients within the transfer domain coefficient compression matrix, associated with an identified beam, and
wherein the look-up table identifies a plurality of bit-points that identifies respective combinations of locations of the selected transfer domain coefficients within the transfer domain coefficient compression matrix, associated with the identified beam.

23. The method of claim 22, wherein a number of the bit-points identified in the look-up table is based at least on a number of combinations for selecting a selected number of the transfer domain coefficients from an overall number of coefficients available for each identified beam,
wherein a number of bits for reporting the bit-point is based at least on, a ceiling of a logarithmic function, based by 2, of the number of the bit-points identified in the look-up table, and
wherein a number of bits for reporting the bit-points regarding all identified beams is based at least on, a summation of numbers of bits for reporting the bit-points associated with all identified beams.

24. The method of claim 22, wherein an overall number of coefficients available for each identified beam is based on at least one of a constraint of maximum number of coefficients, or a constraint of a minimum number of coefficients to feedback associated with each identified beam.

25. The method of claim 1, further comprising:
for all identified beams, applying bit-points, based at least on a look-up table, to indicate locations of a set of the selected transfer domain coefficients within the transfer domain coefficient compression matrix, wherein the look-up table identifies a plurality of bit-points that identify respective combinations of locations of the selected transfer domain coefficients within the transfer domain coefficient compression matrix, associated with all identified beams.

26. The method of claim 25, wherein a number of the bit-points identified in the look-up table is based at least on multiplication results of all the respective combination numbers associated with all respective identified beams, for selecting a selected number of the transfer domain coefficients from an overall number of coefficients available for each identified beam,
wherein a number of bits for reporting the bit-points is based at least on, a ceiling of a logarithmic function, based by 2, of a number of the bit-points identified in the look-up table.

27. The method of claim 25, wherein an overall number of coefficients available for each identified beam is based on at least one of a constraint of a maximum number of coefficients or a constraint of a minimum number of coefficients to feedback associated with each identified beam.

28. An apparatus for wireless communication by a User Equipment (UE), comprising:
at least one processor configured to:
determine a constraint on a total number of transfer domain coefficients to be reported for compressed Channel State Information (CSI) feedback by the UE for a plurality of beams identified for the feedback, wherein each transfer domain coefficient is associated with amplitude information and phase information, and wherein a transfer domain for the transfer domain coefficients is based at least on a set of DFT (Discrete Fourier Transform) bases or a set of DCT (Discrete Cosine Transfer) bases;
    select from a transfer domain coefficient compression matrix, based on the constraint, a set of one or more transfer domain coefficients to report for each of the beams;
    report information indicating a number of selected transfer domain coefficients in the set of the one or more transfer domain coefficients for each beam and a location of each transfer domain coefficient within the transfer domain coefficient compression matrix; and
    report at least the amplitude and phase information for the selected transfer domain coefficients; and
a memory coupled to the at least one processor.

29. A method for wireless communication by a Base Station (BS), comprising:
    transmitting reference signals to be applied by a User Equipment (UE) for Channel State Information (CSI) feedback to the BS;
    determining a constraint on a total number of transfer domain coefficients to be reported for compressed CSI feedback by the UE for a plurality of beams identified for the feedback, wherein each transfer domain coefficient is associated with amplitude information and phase information, and wherein a transfer domain for the transfer domain coefficients is based at least on a set of DFT (Discrete Fourier Transform) bases or a set of DCT (Discrete Cosine Transfer) bases;
    receiving as part of the compressed CSI feedback:
        information indicating a number of the transfer domain coefficients in a set of transfer domain coefficients for each beam, the transfer domain coefficients selected from a transfer domain coefficient compression matrix based on the constraint;
        a location of each selected transfer domain coefficient within the transfer domain coefficient compression matrix; and
        at least the amplitude and phase information for the selected transfer domain coefficients; and
    adjusting a configuration of one or more antennas of the BS based on the received compressed CSI feedback.

30. An apparatus for wireless communication by a Base Station (BS), comprising:
    at least one processor configured to:
        transmit reference signals to be applied by a User Equipment (UE) for Channel State Information (CSI) feedback to the BS;
        determine a constraint on a total number of transfer domain coefficients to be reported for compressed CSI feedback by the UE for a plurality of beams identified for the feedback, wherein each transfer domain coefficient is associated with amplitude information and phase information, and wherein a transfer domain for the transfer domain coefficients is based at least on a set of DFT (Discrete Fourier Transform) bases or a set of DCT (Discrete Cosine Transfer) bases;
        receive as part of the compressed CSI feedback:
            information indicating a number of the transfer domain coefficients in a set of transfer domain coefficients for each beam, the transfer domain coefficients selected from a transfer domain coefficient compression matrix based on the constraint;
            a location of each selected transfer domain coefficient within the transfer domain coefficient compression matrix; and
            at least the amplitude and phase information for the selected transfer domain coefficients; and
        adjust a configuration of one or more antennas of the BS based on the received compressed CSI feedback; and
    a memory coupled to the at least one processor.

\* \* \* \* \*